United States Patent
Poddar et al.

(10) Patent No.: US 11,931,958 B2
(45) Date of Patent: Mar. 19, 2024

(54) EXTRUSION NOZZLE FOR ADDITIVE MANUFACTURING

(71) Applicant: PRISAM LLC, Rochester, NY (US)

(72) Inventors: Pritam Poddar, Rochester, NY (US); Adam Foster, Villennes sur Seine (FR); Xavier Tarr, Rochester, NY (US); Justin Kon, Rochester, NY (US)

(73) Assignee: PRISAM LLC, Rochester, NY (US)

( * ) Notice: Subject to any disclaimer, the term of this patent is extended or adjusted under 35 U.S.C. 154(b) by 0 days.

(21) Appl. No.: 17/809,735

(22) Filed: Jun. 29, 2022

(65) Prior Publication Data
US 2024/0001609 A1 Jan. 4, 2024

(51) Int. Cl.
*B29C 64/209* (2017.01)
*B29C 64/295* (2017.01)
*B33Y 30/00* (2015.01)

(52) U.S. Cl.
CPC .......... *B29C 64/209* (2017.08); *B29C 64/295* (2017.08); *B33Y 30/00* (2014.12)

(58) Field of Classification Search
CPC .............................. B29C 64/209; B29C 64/00
See application file for complete search history.

(56) References Cited

U.S. PATENT DOCUMENTS

| | | |
|---|---|---|
| 5,121,329 A | 6/1992 | Crump |
| 10,875,288 B2 | 12/2020 | Chapiro et al. |
| 2019/0118471 A1* | 4/2019 | Heiligenstein .......... B29C 48/92 |
| 2020/0063690 A1* | 2/2020 | Coppola .................. F02F 1/36 |
| 2020/0130264 A1* | 4/2020 | Fukase .................. B29C 64/245 |
| 2022/0176621 A1* | 6/2022 | Leibig .................. B29C 64/106 |
| 2022/0288851 A1* | 9/2022 | Inomoto ................ B33Y 30/00 |

* cited by examiner

*Primary Examiner* — Seyed Masoud Malekzadeh
*Assistant Examiner* — Tiffany Yu Huang
(74) *Attorney, Agent, or Firm* — Aleksandar Nikolic

(57) ABSTRACT

A nozzle for additive manufacturing having a body having a thermally conductive material, a front side opposite a back side, a first side opposite a second side, the first side and the second side connected to and between the front side and the back side. The nozzle further has a top end opposite an extrusion end, and the body tapers at the extrusion end to a nozzle opening. A first conduit extends through the body from an opening in the top end to the nozzle opening in the extrusion end. A heater conduit, adjacent to the first conduit, extends from a heater opening in the top end and into the body towards the extrusion end and a sensor conduit, adjacent to the first conduit, extends from a sensor opening in the top end and into body towards the extrusion end.

20 Claims, 21 Drawing Sheets

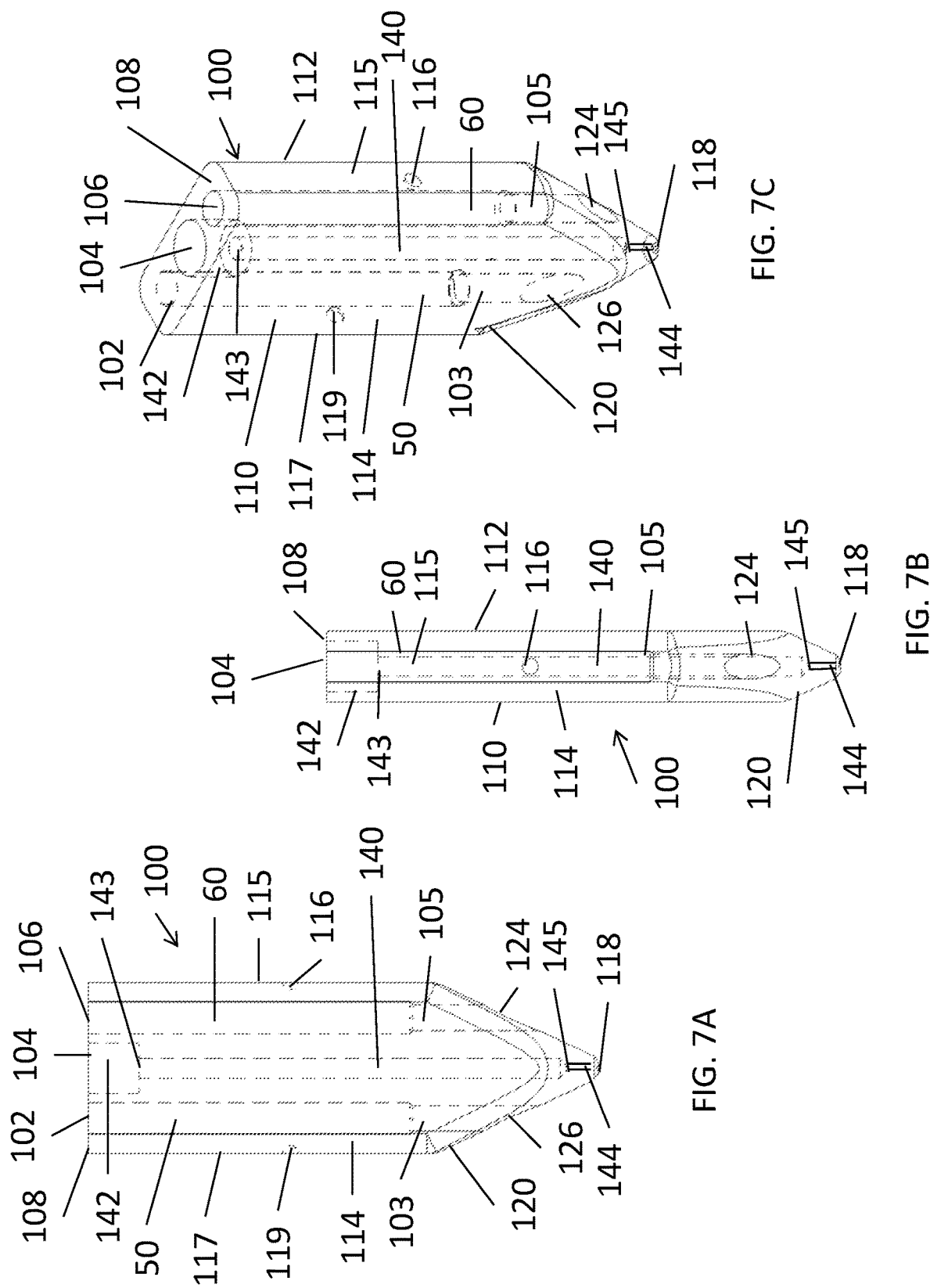

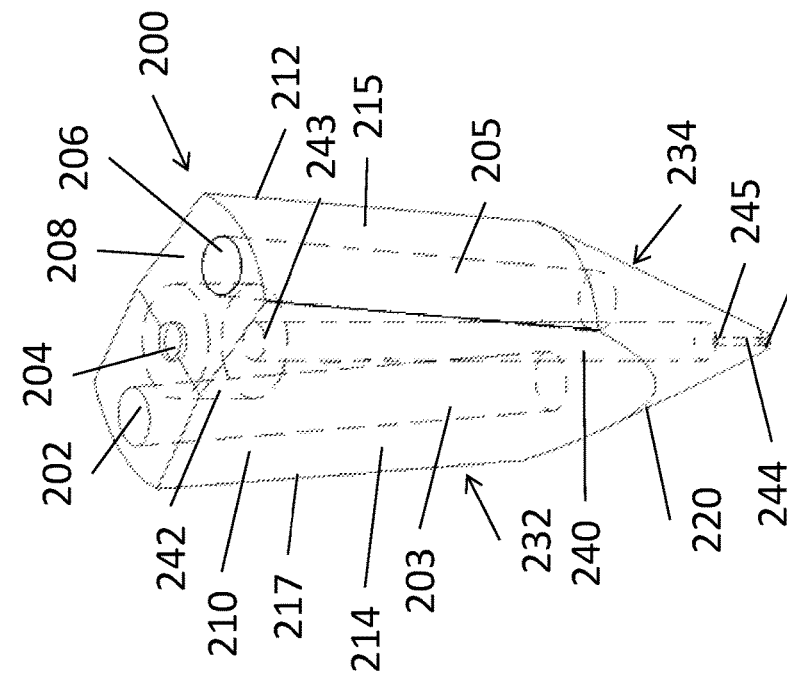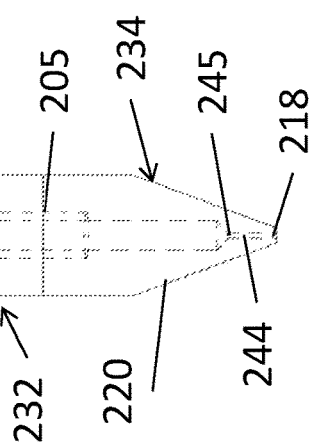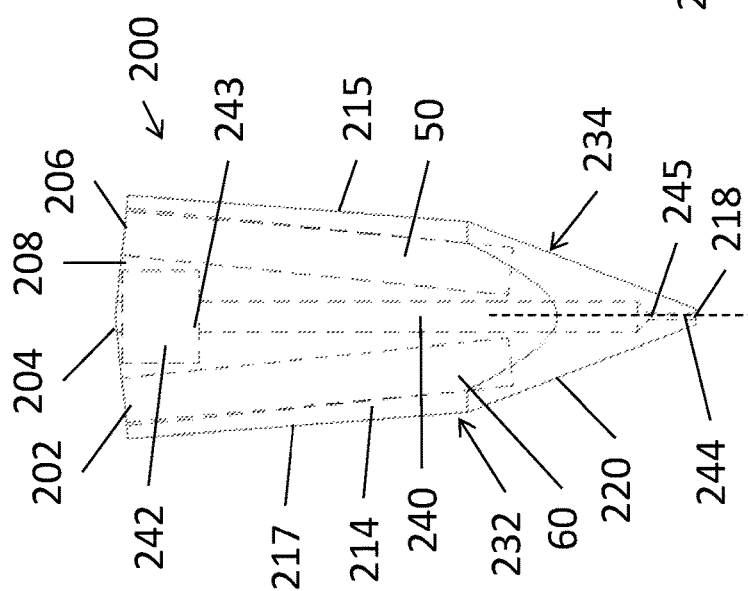

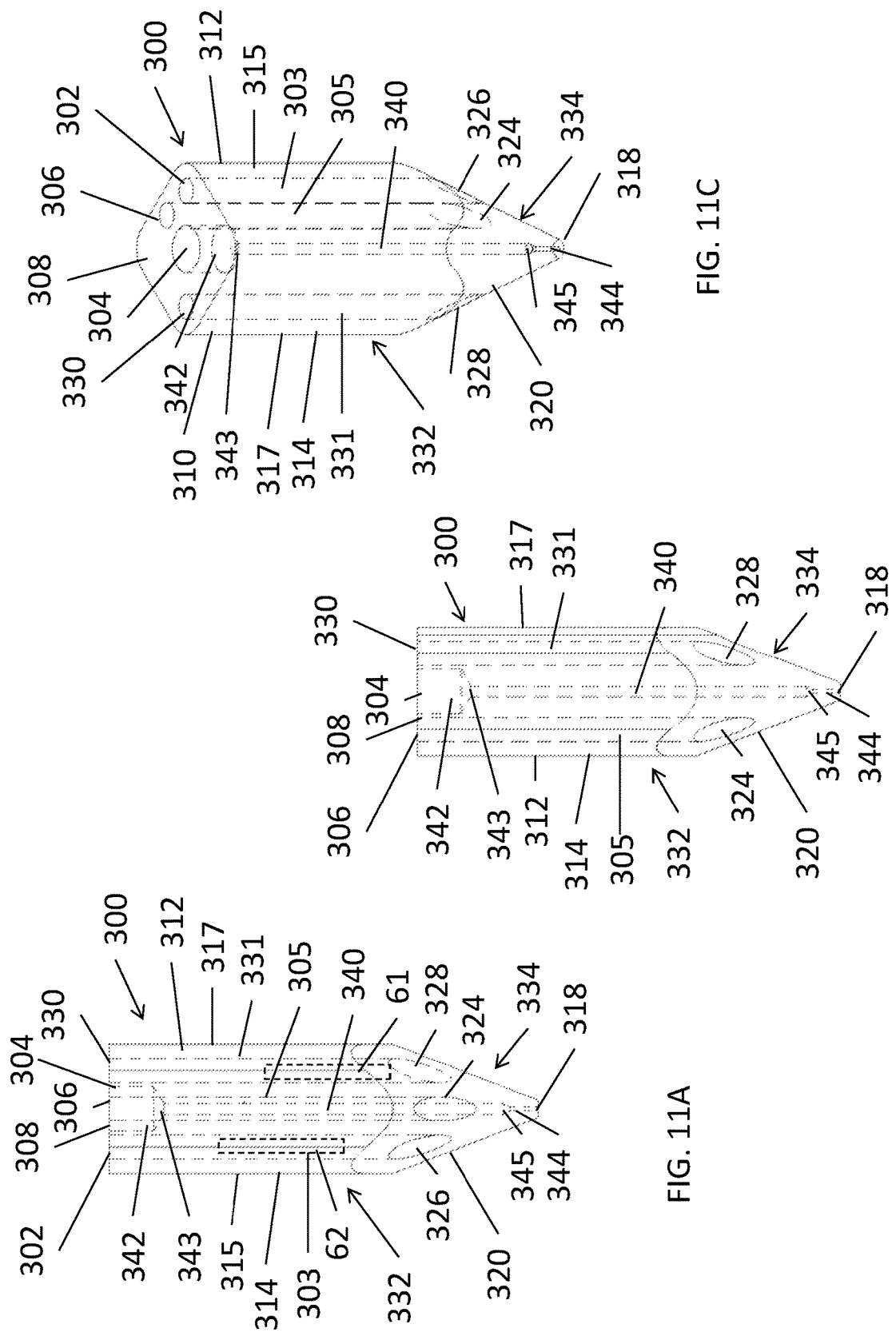

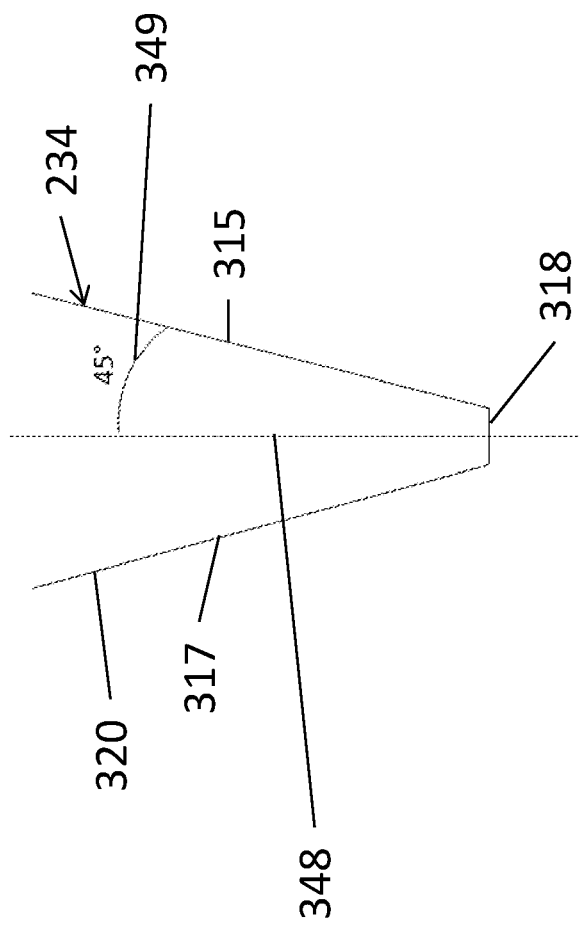

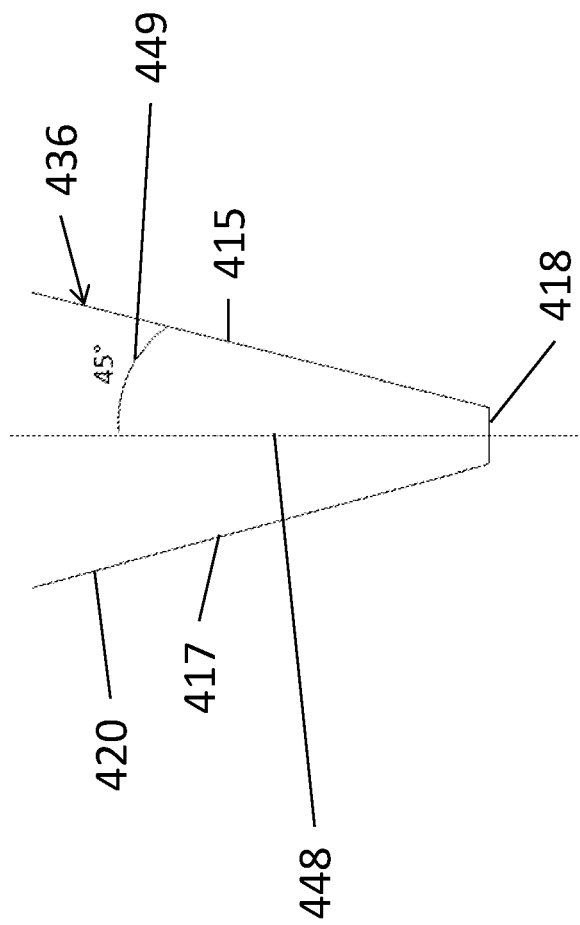

EXTRUSION NOZZLE FOR ADDITIVE MANUFACTURING

BACKGROUND OF THE INVENTION

Technical Field

This invention is related to additive manufacturing. More specifically, this invention is related to systems, methods, devices, and manufactures using fused filament fabrication or fused granulate fabrication nozzles for additive manufacturing of structures using nonplanar toolpathings or for additive manufacturing of high volume sequential parts.

Background Information

Current limitations in fused filament fabrication ("FFF") and fused granulate fabrication ("FGF") systems and similar additive manufacturing methods result in parts having strength limitations due to current additive lamination processes and printing speeds. Further limitations exist because existing heater/nozzle combinations have difficulty printing in confined spaces.

For non-planar structures, single nozzle FFF or FGF systems are currently used. However, FFF and FGF systems are currently limited in the types of non-planar structures that can be created and by the number of structures that can be created in a sequence in a single print. Furthermore, FFF and FGF systems are slow and create non-planar structures that have poor structural strength characteristics. A heat block is currently used with commercial nozzles and the heat block is generally located between a heat exchanger and the commercial nozzle itself. One current method uses insulated longer nozzles in an attempt to maintain nozzle temperature. But insulation tends to increase nozzle size and negates the ability to operate in confined spaces and limits print angles. A current second method attempts to improve extrusion speed by creating higher flow rates of extruded material. This second method commonly uses larger material input pellets, but this requires a costly and bulky heating and extrusion system, with the bulkiness limiting print angles. The heat block often interferes with extrusion angles that are near or above 22.5°. Thus, current nozzles and heating systems limit arm dexterity and limit operation in small spaces.

The current invention addresses the issue of part strength through lattice geometry and improved extrusion speed.

SUMMARY OF THE INVENTION

The present disclosure is directed toward systems, methods, devices, and manufactures using fused filament fabrication or pellet-based extrusion for manufacturing lattice geometry structures using nonplanar toolpathings in additive manufacturing.

In one aspect of the present disclosure provided herein, is a nozzle for additive manufacturing having a body having a thermally conductive material, a front side opposite a back side, a first side opposite a second side, the first side and the second side connected to and between the front side and the back side. The nozzle further has a top end opposite an extrusion end, and the body tapers at the extrusion end to a nozzle opening. A first conduit extends through the body from an opening in the top end to the nozzle opening in the extrusion end. A heater conduit, adjacent to the first conduit, extends from a heater opening in the top end and into the body towards the extrusion end and a sensor conduit, adjacent to the first conduit, extends from a sensor opening in the top end and into body towards the extrusion end.

In another aspect of the present disclosure provided herein, is a method for additive manufacturing, including using a nozzle having a body, a coupler connection opening longitudinally opposite a nozzle opening and connected through the body by a first conduit, at least one heater conduit containing a heater extending longitudinally from at least one heater conduit opening adjacent to the coupler connection opening, and into the body towards the nozzle opening, a sensor conduit extending longitudinally from a sensor conduit opening adjacent to the coupler connection opening, and into the body towards the nozzle opening. The method includes attaching a coupler, connected to a material feeder, through a heat exchanger to the nozzle; feeding material into the first conduit; heating, by the heater, the nozzle to a temperature above a glass transition temperature of the material; measuring the temperature of the nozzle; and extruding extrudate from the nozzle opening wherein the extrudate is in a liquid state upon exiting the nozzle opening.

These and other objects, features, and advantages of this disclosure will become apparent from the following detailed description of the various aspects of the disclosure taken in conjunction with the accompanying drawings.

BRIEF DESCRIPTION OF THE DRAWINGS

FIG. 7A, depicts a front view nozzle of FIG. 1, in accordance with one or more embodiments set forth herein;

FIG. 7B, depicts a side view of the nozzle of FIG. 1, in accordance with one or more embodiments set forth herein;

FIG. 7C, depicts a perspective view of the nozzle of FIG. 1, in accordance with one or more embodiments set forth herein;

FIG. 9A, depicts a front view of the second nozzle of FIG. 8A, in accordance with one or more embodiments set forth herein;

FIG. 9B, depicts a side view of the second nozzle of FIG. 8A, in accordance with one or more embodiments set forth herein;

FIG. 9C, depicts a perspective view of the second nozzle of FIG. 8A, in accordance with one or more embodiments set forth herein;

FIG. 11A, depicts a rear view of the third nozzle of FIG. 10A, in accordance with one or more embodiments set forth herein;

FIG. 11B, depicts a rear perspective view of the third nozzle of FIG. 10A, in accordance with one or more embodiments set forth herein;

FIG. 11C, depicts a perspective view of the third nozzle of FIG. 10A, in accordance with one or more embodiments set forth herein;

FIG. 11D, depicts an angle of taper of the front view of FIG. 10A, in accordance with one or more embodiments set forth herein;

FIG. 13D, depicts an angle of taper of the front view of FIG. 12A, in accordance with one or more embodiments set forth herein;

DETAILED DESCRIPTION OF THE INVENTION

Figure 1:
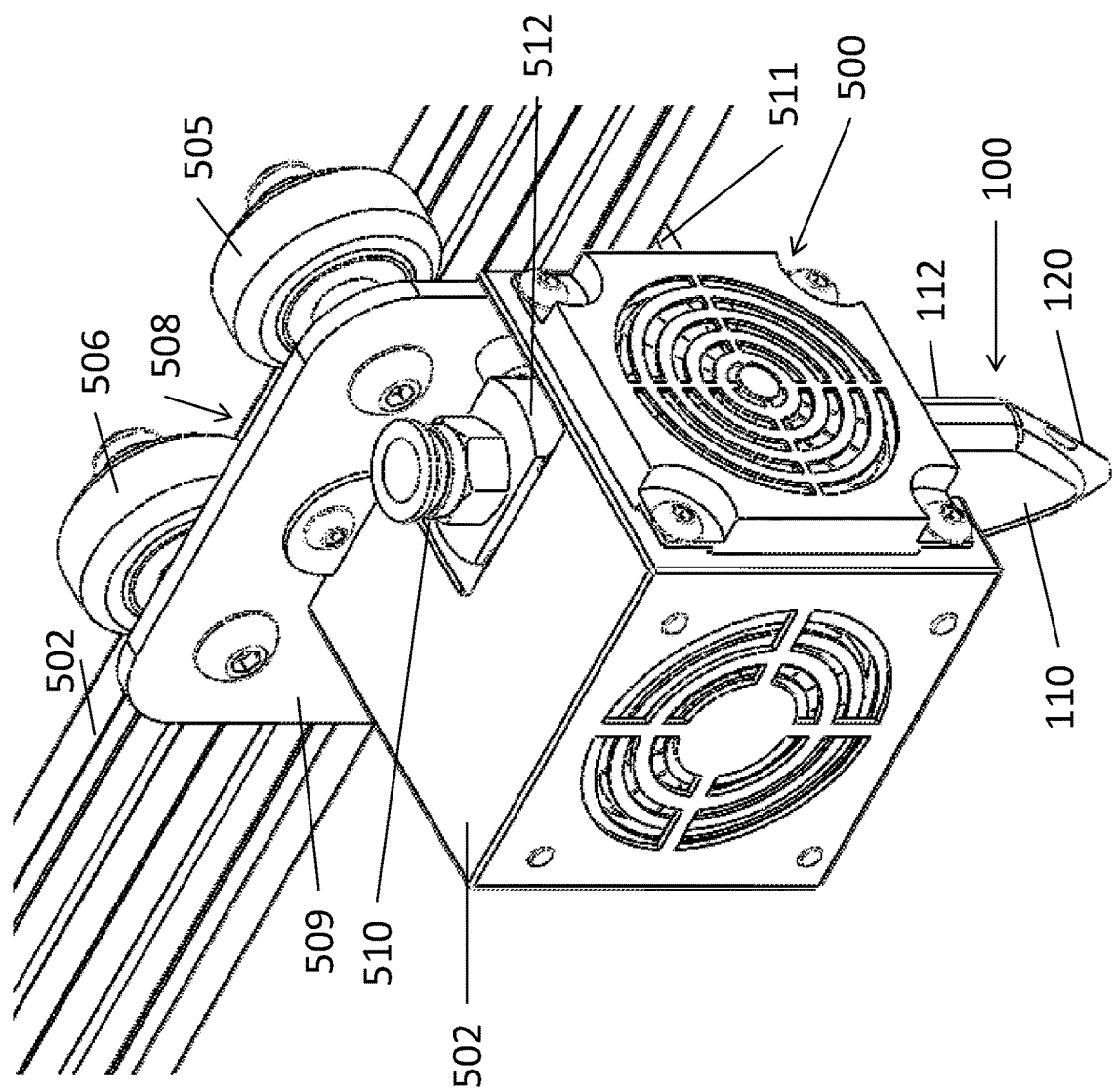
FIG. 1, depicts a front view of a nozzle connected to a robotic additive manufacturing assembly, in accordance with one or more embodiments set forth herein.

Aspects of the present disclosure and certain embodiments, features, advantages, and details of the present disclosure, are explained in more detail below with reference to the non-limiting examples illustrated in the accompanying drawings. Descriptions of well-known materials, fabrication tools, processing techniques, etc., are omitted to minimize confusion of the relevant details. The detailed description and the specific examples indicate aspects of the disclosure, but are given for illustration only and are not for limitation. Various substitutions, modifications, additions, and/or arrangements, within the spirit and/or scope of the underlying inventive concepts will be apparent to those skilled in the art. Certain methods described herein with reference to certain steps that are presented in a certain order, in many instances, these steps may be performed in any order as may be appreciated by one having ordinary skill in the art and the methods are not limited to the particular arrangement of steps disclosed herein.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one embodiment" are not intended to be interpreted as excluding the existence of additional embodiments that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any embodiment that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be."

As used herein, the term "portion" is not limited to a single continuous body of material unless otherwise noted. A "portion" may include multiple sub-portions that may be the same or differing materials, and/or may include coatings, adhesives, and the like, and may be a separate and distinct component or may be an integral section, segment, or fragment of a larger component. As used herein, the term "coupled" is not limited to a direct coupling of two separate and distinct components. Two "coupled portions" may include indirectly coupled portions or directly coupled portions.

The invention herein will be better understood by reference to the figures wherein like reference numbers refer to like components.

Referring to the drawings, wherein like reference numerals are used to indicate like or analogous components throughout the several views, and with particular reference to FIG. 1, an additive manufacturing extrusion nozzle 100 may be connected to a robotic additive manufacturing assembly 500. The robot additive manufacturing assembly 500 includes a carriage assembly 508 connected to a fan assembly 502. The carriage assembly 508 is movably connected to a track 504. The carriage assembly 508 has a carriage plate 509 movably connected to the track 504 by a first roller 505 and a second roller 506 in contact with the top part of track 504, and a support arm 511 positioned below the track. The first roller 505 and the second roller 506 may facilitate movement of the carriage 508 along the track 504. The support arm 511 may have a roller or rollers in contact with the bottom of the track 504.

The fan assembly 502 is connected to the carriage plate 509. A heat exchange 512 may be extending into the fan assembly 502 from the top of the fan assembly 502. The fan assembly 502 surrounds the heat exchanger 512 on three sides with a fourth side of the heat exchanger 512 being positioned against and connected to the carriage plate 509. Extending away from the heat exchanger 512 and out from the top of fan assembly 502 is a coupler 510 configured (e.g., shaped and dimensioned) to connect to a material feed tube.

Extending out from and below the fan assembly 502 is the nozzle 100. Nozzle 100 may have a front side 110 opposite a back side 112, with the back side 112 facing in the direction of the carriage plate 509 and track 504 and the front side 110 facing away. An extrusion end 120 may be.

Figure 2:
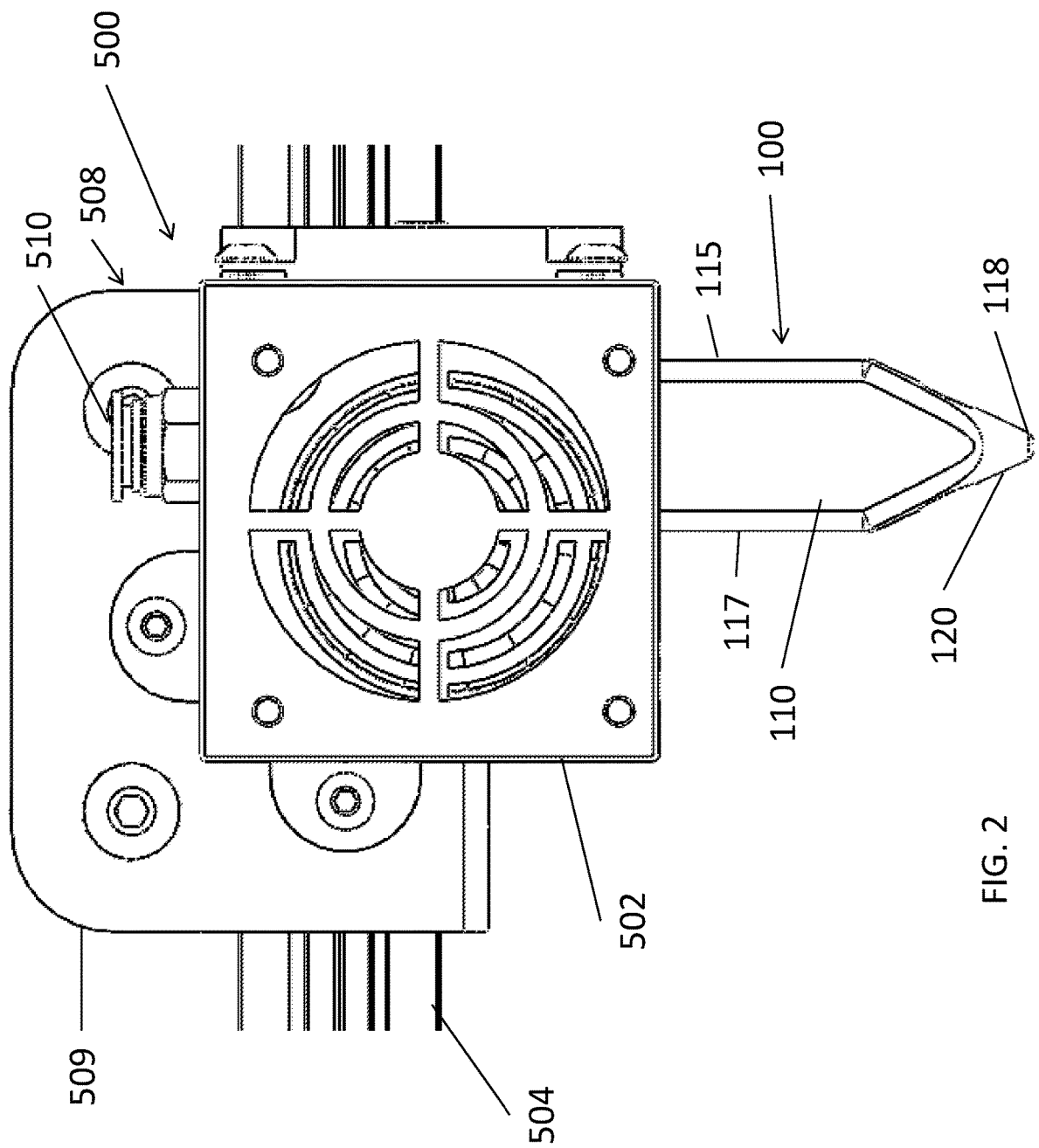
FIG. 2, depicts a perspective view of the nozzle connected to the robotic additive manufacturing assembly of FIG. 1, in accordance with one or more embodiments set forth herein.

With reference to FIG. 2, a front view of the robotic manufacturing assembly 500 shows the nozzle 100 issuing out from and away from the bottom of the fan assembly 502. A first side 115 and a second side 117 may be the sides of the nozzle 100. The extrusion end 120 ends in a nozzle opening 118.

Figure 3:
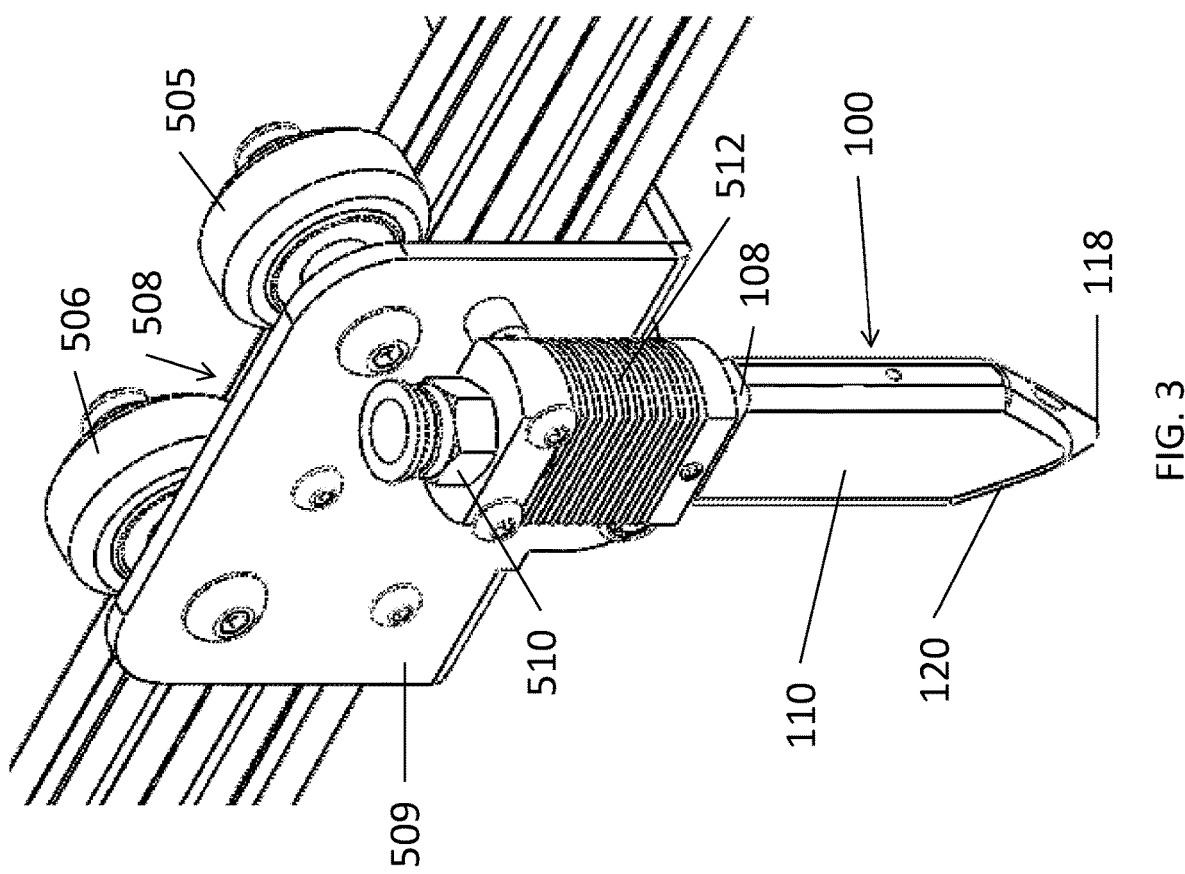
FIG. 3, depicts perspective view of the nozzle connected to a robotic additive manufacturing assembly of FIG. 1 with the heat sink removed, in accordance with one or more embodiments set forth herein.

With reference to FIG. 3, the robotic manufacturing assembly 500 of FIGS. 1 and 2 is depicted with the fan assembly 502 removed. Referring to FIG. 3, the heat exchanger 512 is connected to be carriage plate 509. Connected to the heat exchanger 512 the nozzle 100 may extend below and away from the heat exchanger 512. A top end 108 of the nozzle 100 is connected to the heat exchanger 512. The coupler 510 and the nozzle 100 may be connected at opposite ends of the heat exchanger 512.

Figure 4:
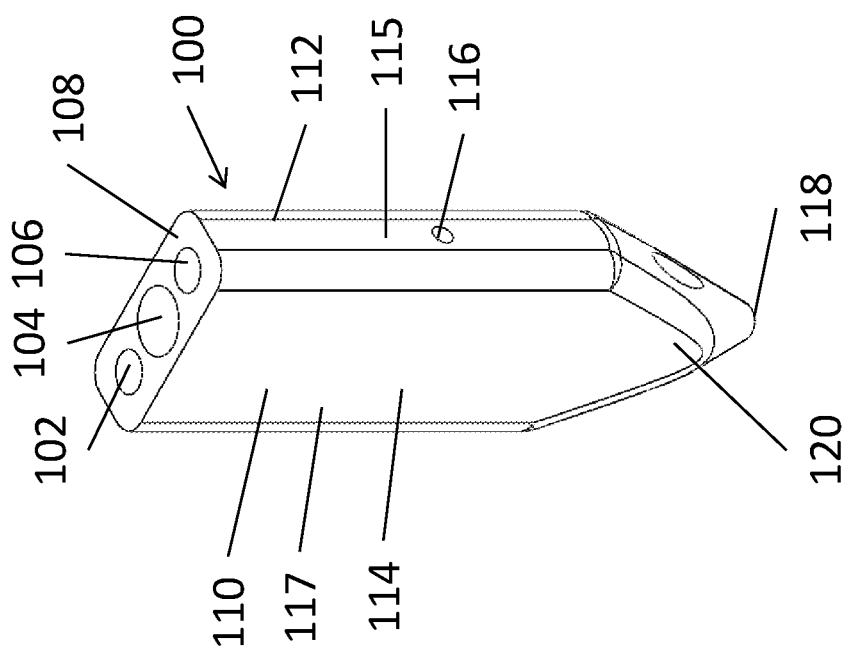
FIG. 4, depicts a perspective view of the nozzle of FIG. 1, in accordance with one or more embodiments set forth herein.

With reference to FIG. 4, the additive manufacturing extrusion nozzle 100 has the front side 110 opposite the back side 112, and connected by the first side 115 and the second side 117, therebetween, forming the body 114. The body 114 has the top end 108 opposite the nozzle opening 118 at the tip of the extrusion end 120. The top end 108 is a surface having sides formed by the front side 110, the back side 112, the first side 115, and the second side 117, forming a rectangular shape. The longitudinal distance from the top end 108 to the extrusion end 120 may be greater than distance from the front side 110 to the back side 112, and may be greater than the distance from the first side 115 to the second side 117. The distance from the first side 115 to the second side 117 may be greater than the distance from the front side 110 to the back side 112. The rectangular shape of the body 114 at the top end 108 extends from the top end 108 towards the extrusion end 120. Moving in a longitudinal direction, from the top end 108 towards the extrusion end 120, the body may be rectangular for a portion of the body. But at the extrusion end 120, the front side 110 and the back side 112 taper towards each other and the first side 115 and the second side 117 taper towards each other, forming a conical shape towards the nozzle opening 118. The nozzle opening 118 may be, for example, substantially circular. In other embodiments, the nozzle opening 118 may be any shape configured (e.g., shaped and dimensioned) for fused filament fabrication ("FFF") and/or fused granulate fabrication ("FGF").

The angle of taper of the first side 115 towards the second side 117 at the extrusion end 120 towards the nozzle opening 118 forms an angle of taper. Referring to FIG. 6C, an angle of taper 149 may be 45° for the nozzle 100. A longitudinal midline 148 is show between the first side 115 and the second side 117. The angle of taper 149 may be between the midline 148 of the nozzle 100 and the first side 115 but may also be the angle between the midline 148 and the second side 117, with the angle between the midline 148 and the first side 115 being approximately equal to the angle of taper between the midline 148 and the second side 117. The angle of taper 148 may be shown as 45°, but may be an angle in a ranger from approximately 10° to approximately 45° in other embodiments.

The top end 108 has a coupler connection opening 104, a sensor opening 106, and a heater opening 102. The sensor opening 106 may be adjacent to the coupler connection opening 104 towards the first side 115. The heater opening 102 may be adjacent to the coupler connection opening 104 towards the second side 117. As depicted in FIG. 1A, the heater opening 102 and the sensor opening 106 may be on opposite sides of the coupler connection opening 104. However, the first side 115 and second side 117 may be interchanged, and need not specifically be on one side or the other. The sensor opening 106 and the heater opening 102 may also be interchanged, and need not be specifically on one side or the other.

Figure 5:
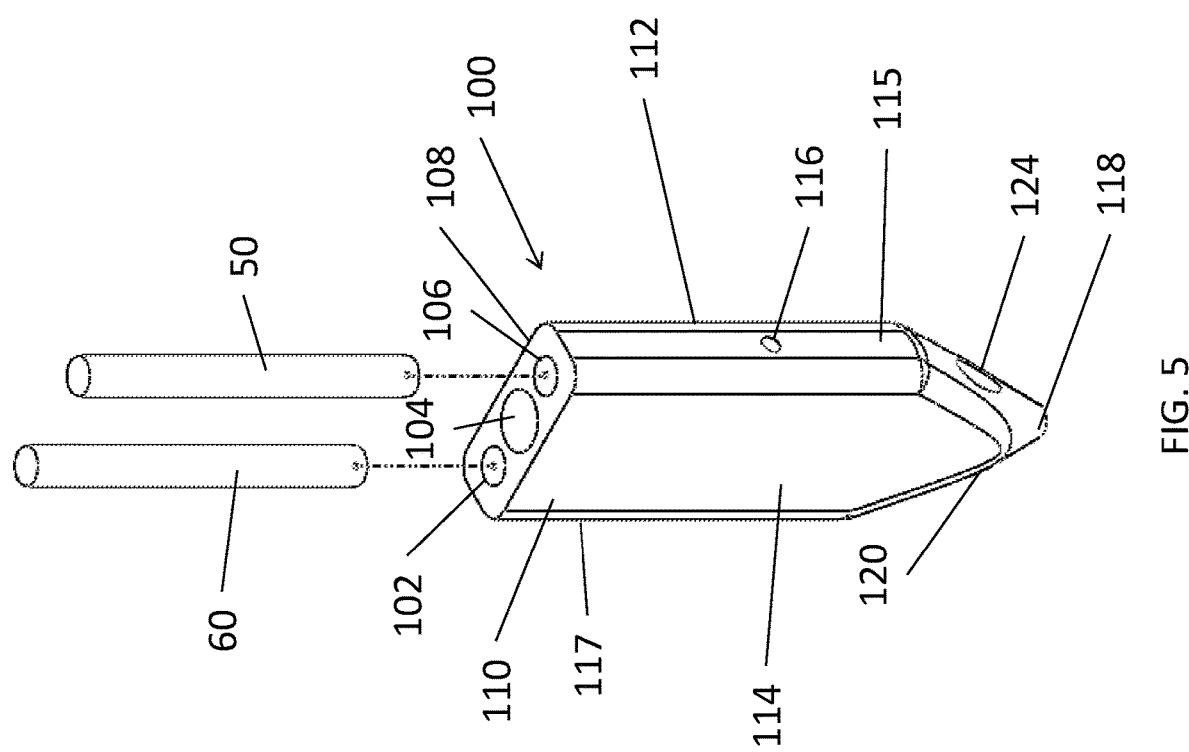
FIG. 5, depicts the nozzle of FIG. 1 with a heater and a temperature sensor, in accordance with one or more embodiments set forth herein.

With reference to FIG. 5, the nozzle 100 may be with a temperature sensor 50 positioned above the sensor opening 106 and a heater 60 (also referred to as a heat cartridge), positioned above the heater opening 102. The temperature sensor 50 may be, for example, a thermocouple, a thermistor, or any other similar temperature sensor. The temperature sensor may be, of a type with measurement range capabilities of at least 150-500° C. In certain applications a temperature sensor with top end measurement range capabilities above 500° C. may be used. A first fastener hole 116 may be in first side 115. A second fastener hole (not show) opposite the first fastener hole 116 is in the second side 117. A sensor through the through hole 124 may be on a portion of the tapered end of the first side 115.

Figure 6B:
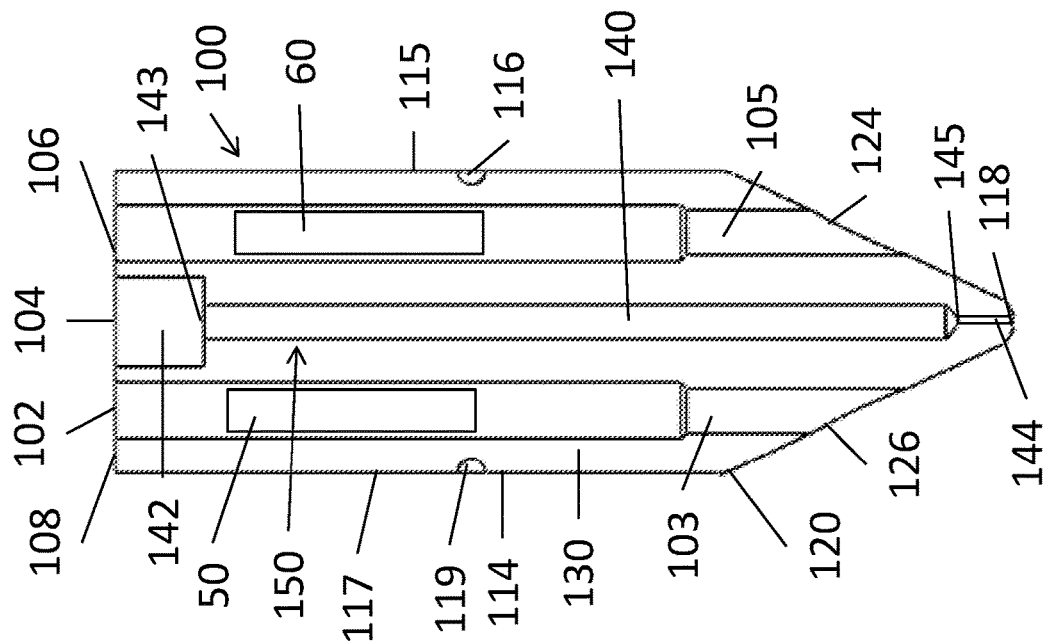
FIG. 6B, depicts a frontal cross section view of the nozzle of FIG. 1 with the heater and the temperature sensor inserted into the first nozzle, in accordance with one or more embodiments set forth herein.
Figure 6A:
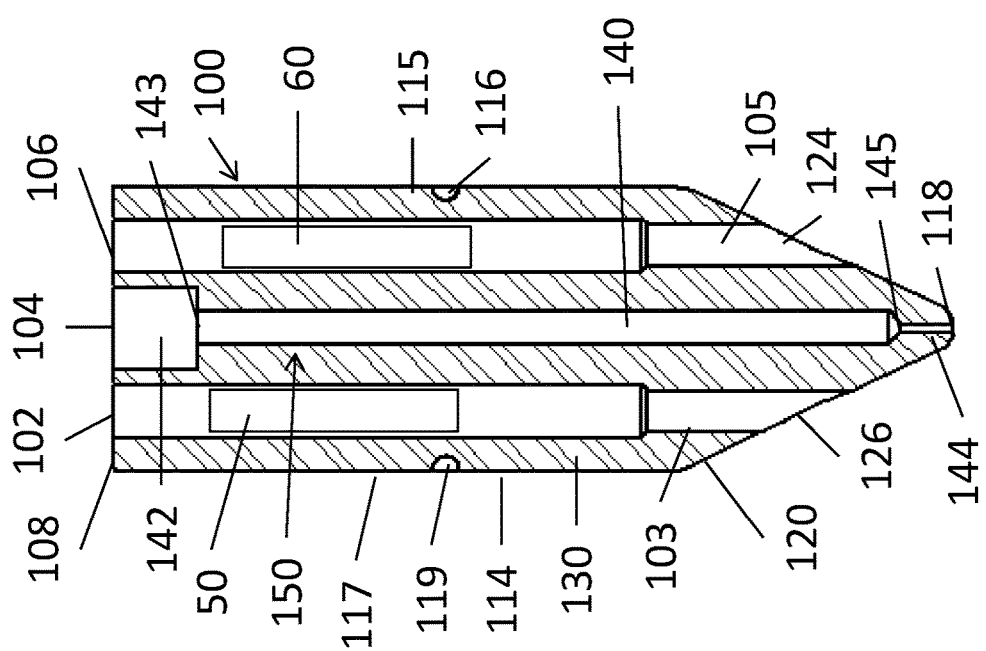
FIG. 6A, depicts a frontal cross section view of the nozzle of FIG. 1 with the heater and the temperature sensor inserted into the first nozzle, in accordance with one or more embodiments set forth herein.
Figure 6C:
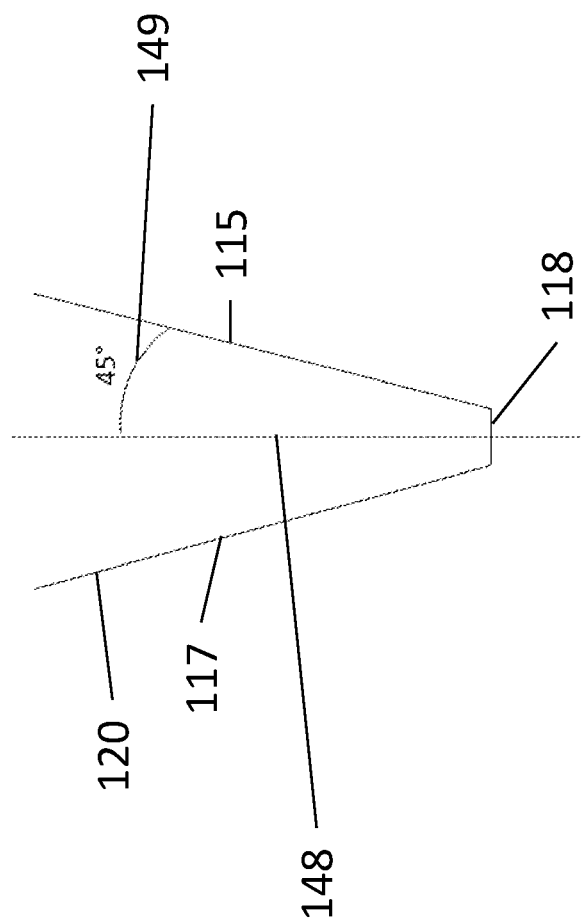
FIG. 6C, depicts an angle of taper of the front view of FIG. 1, in accordance with one or more embodiments set forth herein.

With reference to FIGS. 6A and 6B, a frontal cross section of nozzle 100 is depicted. A first conduit 150 extends from the coupler opening at the top end 108 to the nozzle opening 118. The first conduit 150 may be a single diameter conduit or the first conduit 150 may include multiple sections of similar or different diameters. Extending into the body 114 from the coupler connection opening 104 towards the nozzle opening 118 is a coupler slot 142 which may also be referred to as a transition conduit. The coupler slot 142 has a first material conduit opening 143, opposite the coupler connection opening 104. A material conduit 140 extends from the first material conduit opening 143 into body 114 towards the nozzle opening 118. The material conduit 140 has a second material conduit opening 145, from which an extrudate conduit 144 extends to the nozzle opening 118. The second material conduit opening 145 may have the extrudate conduit 144 extending therefrom, with the second material conduit opening 145 and the extrudate conduit 144 having smaller diameters than the material conduit 140. In some embodiments, the diameters of the extrudate conduit 144 and material conduit opening 145 may be smaller than that of the material conduit 140. However, in other embodiments, the second material conduit opening 145 and the extrudate conduit 144 may have approximately the same diameter as the material conduit 140. In some embodiments, the material conduit 140 may include the extrudate conduit 144. The first conduit 150, as shown in FIG. 6B includes three sections; the coupler slot 142, the material conduit 140 and the extrudate conduit 144.

With reference to FIG. 3 and FIG. 6A, the heat exchanger 512 may have, for example, an extension (not shown) configured (e.g., shaped and dimensioned) for insertion through the coupler connection opening 104 and into the coupler slot 142 to connect the heat exchanger 512 to the nozzle 100. In certain embodiments, for example, the coupler slot 142 may have threading and the heat exchange extension may have matching threading such that the nozzle 100 may be screwed onto the heat exchanger. While threading has been described, other common fastening means may also be used to connect the heat exchanger 512 and the nozzle 100.

A sensor conduit 105 extends from the sensor opening 106 at the top end 108 and into the body 114 towards the extrusion end 120. A heater conduit 103 extends from the heater opening 102 at the top end 108 and into the body 114 towards the extrusion end 120. A solid interior 130 of body 114 may be. The coupler slot 142 and material conduit 140, the sensor conduit 105, and the heater conduit 103 extend through the solid interior 130 and are separated by the solid interior 130. The solid interior may be, for example, a thermally conductive material, a composition of thermally conductive materials, or a combination of conductive and insulating materials.

With continued reference to FIGS. 6A and 6B, the temperature sensor 50 is, for example, inserted through the sensor opening 106 into the sensor conduit 105 and the heater 60 may be inserted through the heater opening 102 into heater conduit 103, in an assembled nozzle 100.

As shown in FIGS. 6A and 6B, the sensor conduit 105 extends through the body 114 towards the sensor through hole 124 located on the tapered portion of the first side 115. The temperature sensor 50 may, for example, be less than the length of the sensor conduit 105 such that the inserted temperature sensor 50 may extend along only a portion of the sensor conduit 105. In another embodiment, the temperature sensor 50 may be as long as the sensor conduit 105 such that the inserted temperature sensor 50 may extend along the entire length of the temperature sensor conduit 105. In still other embodiments, the temperature sensor 50 may, for example, be longer than the length of the temperature sensor conduit 105 such that the inserted temperature sensor 50 has a portion of the temperature sensor 50, extending through the sensor through hole 124 and outside of the body 114. In embodiments where the temperature sensor 50 may be longer than the length of the sensor conduit 105, the temperature sensor 50, may be configured (e.g., shaped and dimensioned) to have the portion extending from the sensor through hole 124 in contact with the surface of the extrusion end 120 of the body 114 to and extending to, for example, the nozzle opening 118 or just before the nozzle opening 118.

As shown in FIGS. 6A and 6B, the heater conduit 103 extends through the body 114 towards a heater through hole 126 located on the tapered portion of the first side 115. The heater through hole 126 may be, for example, used to adjust the positioning of the heater 60, within the heater conduit 103. The heater 60 may, for example, be less than the length of the heater conduit 103 such that the inserted heater 60 may extend along only a portion of the heater conduit 103. In another embodiment, the heater 60 may be as long as the heater conduit 103 such that the inserted heater 60 may extend along the entire length of the heater conduit 103.

In still other embodiments, the heater 60 may, for example, be longer than the length of the heater conduit 103 such that the inserted heater 60 has a portion of the heater, extending through the heater through hole 126 and outside of the body 114. In embodiments where the heater 60 may be longer than the length of the heater conduit 103, the heater 60, may be configured (e.g., shaped and dimensioned) to have the portion extending from the heater through hole 126 in contact with the surface of the extrusion end 120 of the body 114 and extending to, for example, the nozzle opening or just before the nozzle opening 118.

The sensor conduit 105 may be positioned within the body but in close proximity to the material conduit 140 such that the temperature sensor 50 inserted in the sensor conduit 105 receives temperature information regarding the material conduit 140. The heater conduit 103 may be positioned within the body 114 but in close proximity to the material conduit 140 such that the heater 60 inserted in the heater conduit 103 heats the body of the nozzle 100 and such that the material conduit 140 may be the same temperature as the body 114. The heater conduit 103 may be positioned so that the heater 60 provides even heat distribution to the material conduit 140 and extrudate conduit 144 during nozzle operation.

As shown in FIGS. 6A and 6B, the heater conduit 103 and the sensor conduit 105 may be, for example, approximately parallel to each other.

In some embodiments, the temperature sensor 50 may be embedded in the sensor conduit 105 and the heater 60 may be embedded in the heater conduit 105. In other embodiments, the temperature sensor 50 and/or the heater 60 may be removable.

With continued reference to FIGS. 6A and 6B, the first fastener hole 116 may be, for example, extend from the surface of the first side 115 and through the body 114 into the temperature sensor conduit 105. The first fastener hole 116 may be, for example, configured (e.g., shaped and dimensioned) to accommodate a set screw (not shown) or other common fastener, with the fastener inserted to hold the temperature sensor 50 at a fixed position within the sensor conduit 105. The second fastener hole 119 may be, for example, extend from the surface on the second side 117 and through the body 114 into the heater conduit 103. The fastener hole 119 may be, for example, configured (e.g., shaped and dimensioned) to accommodate a set screw (not shown) or other common fastener, with the set screw inserted to hold the heater 60 at a fixed position within the heater conduit 103. The first fastener hole 116 and the second fastener hole 119 may, for example have a smooth surface or have threading. There may be embodiments of nozzle 100 without the first fastener hole 116 and the second fastener hole 119.

With reference to FIGS. 7A-7C, the sensor conduit 105 may be positioned approximately the same distance between the front side 110 and the back side 112. The temperature conduit 103 may be positioned approximately the same distance between the front side 110 and the back side 112. The coupler slot 142 is positioned approximately the same distance between the front side 110 and the back side 112 and approximately the same distance between the first side 115 and the second side 117. The material conduit 140 may be positioned approximately the same distance between the front side 110 and the back side 112 and approximately the same distance between the first side 115 and the second side 117.

Figure 8B:
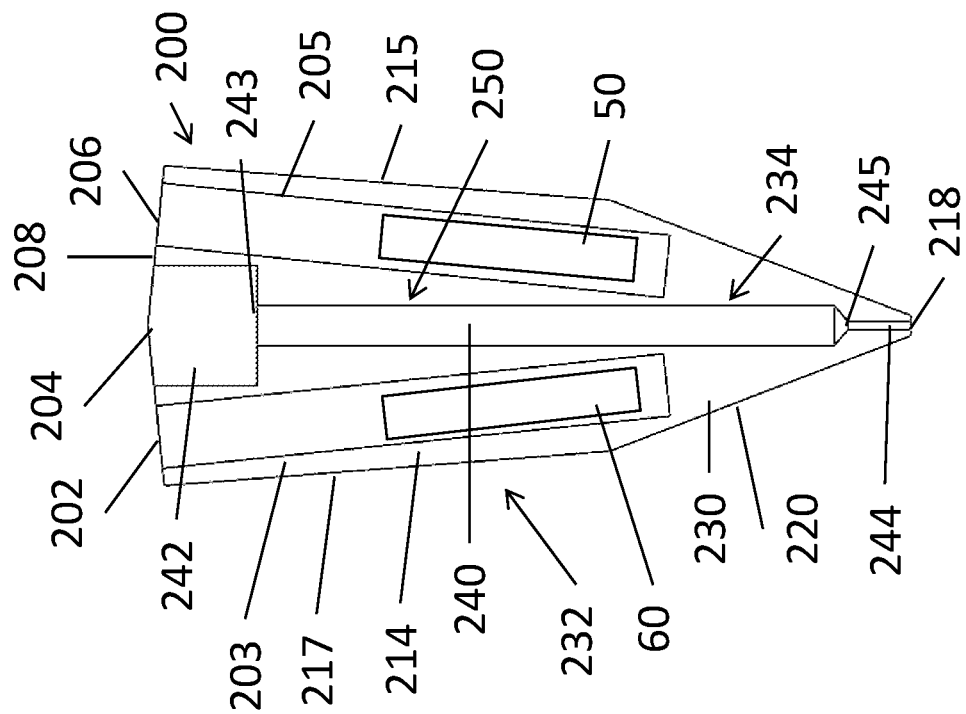
FIG. 8B, depicts a frontal cross section view of the second nozzle of FIG. 8A with the heater and the temperature sensor inserted into the second nozzle, in accordance with one or more embodiments set forth herein.
Figure 8A:
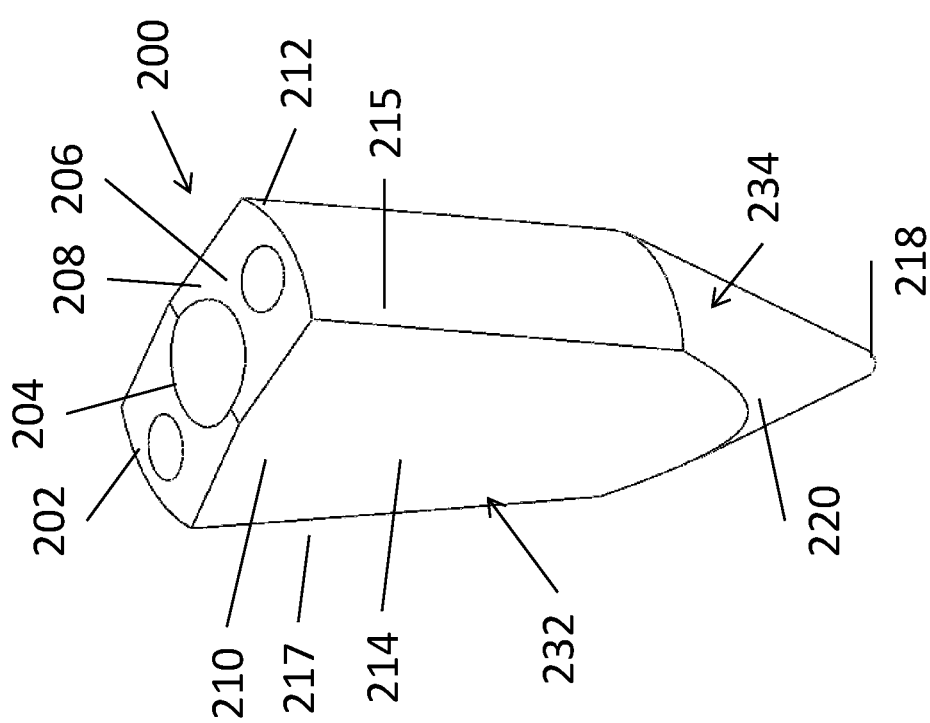
FIG. 8A, depicts a perspective view of a second nozzle, in accordance with one or more embodiments set forth herein.

With reference to FIG. 8A, an additive manufacturing extrusion nozzle 200 may be. Nozzle 200 is another embodiment of nozzle 100. The nozzle 200 has a body 214 having a front side 210 opposite a back side 212, and connected by a first side 215 and a second side 217, therebetween. The body 214 has a top end 208 opposite an extrusion end 220. The top end 208 may be having a peak 201, with top end 208 having sides formed by the front side 210, the back side 212, the first side 215, and the second side 217. The top end 208 may extend from the first side 215 and the second side 217, meeting at the peak 201 at approximately the mid-point between first side 215 and the second side 217. The longitudinal distance from the top end 208 to the extrusion end 220 may be greater than distance from the front side 210 to the back side 212, and may be greater than the distance from the first side 215 to the second side 217. In the longitudinal direction from the top end 208 towards the extrusion end 220, for a first portion of the body 214, the first side 215 tapers towards the second side 217 forming a first tapered section 232. The distance from the first side 215 to the second side 217 may be greater than the distance from the front side 210 to the back side 212 in this first tapered section 232. In the longitudinal direction from the first tapered section 232 towards the extrusion end, tapering between the first side 215 and the second side 217 may be increased and the front side 210 tapers towards the back side 212, forming a second tapered section 234 with a conical shape formed towards a nozzle opening 218.

Figure 9D:
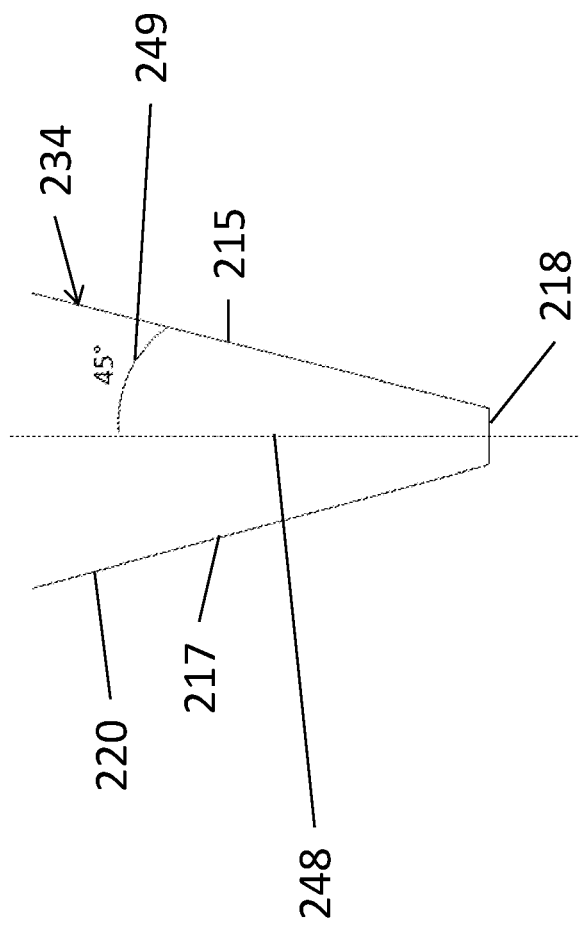
FIG. 9D, depicts an angle of taper of the front view of FIG. 8A, in accordance with one or more embodiments set forth herein.

Tapering of the first side 215 towards the second side 217 at the second tapered section 234 along the extrusion end 220 towards the nozzle opening 218, may form an angle of taper 249 as shown in FIG. 9D. Referring to FIG. 9D, the angle of taper 249 may be 45° for the nozzle 100. A longitudinal midline 248 is show between the first side 215 and the second side 217. The angle of taper 249 may be between the midline 248 of the nozzle 200 and the first side 215 but may also be the angle between the midline 248 and the second side 217, with the angle between the midline 248 and the first side 215 being approximately equal to the angle of taper between the midline 248 and the second side 217. The angle of taper 248 may be shown as 45°, but may be an angle in a range from approximately 10° to approximately 45° in other embodiments.

The angling of the top end 208 towards the peak 201 may be, for example 6° angle from a flat embodiment of top end 208. However, other embodiments of the top end 208 may be approximately flat or have a range of angles from approximately 0° to 15°. For the first tapered section 232, the first side 215 may angle towards the second side 217 at, for example, an angle that may be approximately 6° away from the first side 215 and the second side 217 being parallel. The angle of the first side 215 and the second side 217 towards each other may, for example, range from approximately 0° to 15°, where approximately 0° is the first side 215 being approximately parallel to the second side 217.

The extrusion end 220 has the nozzle opening 218. The nozzle opening 218 may be, for example, substantially circular. In other embodiments, the nozzle opening may be any shape configured (e.g., shaped and dimensioned) for fused filament fabrication ("FFF") and/or fused granulate fabrication ("FGF"). The top end has a coupler connection opening 204, a sensor opening 206, and a heater opening 202. The sensor opening 206 may be adjacent to the coupler connection opening 204 towards the first side 215. The heater opening 202 may be adjacent to the coupler connection opening 204 towards the second side 217. As depicted in FIG. 8A, the heater opening 202 and the sensor opening 206 may be on opposite sides of the coupler connection opening 204. However, the first side 215 and the second side 217 may be interchanged, and need not specifically be on one side or the other. The sensor opening 206 and the heater opening 202 may also be interchanged, and need not specifically be on one side or the other.

With reference to FIG. 8B, a frontal cross section of the nozzle 200 is depicted. A first conduit 250 extends from the coupler opening at the top end 208 to the nozzle opening 218. The first conduit 250 may be a single diameter conduit or the first conduit 250 may include multiple sections of similar or different diameters. A coupler slot 242, which may also be referred to as a transition conduit, extends into the body 214 from the coupler connection opening 204 at the top end 208 towards the nozzle opening 218. The coupler slot 242 has a first material conduit opening 243, opposite the coupler connection opening 204. A material conduit 240 extends from the first material conduit opening 243 into body 214 towards the nozzle opening 218. The material conduit 240 has a second material conduit opening 245, from which an extrudate conduit 244 extends to the nozzle opening 218. The second material conduit opening 245 may be depicted as having the extrudate conduit 244 extending therefrom, with the second material conduit opening 245 and the extrudate conduit 244 having smaller diameters than the material conduit 240. In some embodiments, the diameters may be smaller than that of the material conduit 240. However, in other embodiments, the second material conduit opening 245 and the extrudate conduit 244 may have approximately the same diameter as the material conduit 240. In some embodiments, the material conduit 240 may include the extrudate conduit 244. The first conduit 250, as shown in FIG. 8B, includes three sections; the coupler slot 242, the material conduit 240 and the extrudate conduit 244.

With reference to FIG. 3 and FIG. 8B, the heat exchanger 512 may have, for example, an extension (not shown) configured (e.g., shaped and dimensioned) for insertion through the coupler connection opening 204 and into the coupler slot 242 to connect the heat exchanger 512 to the nozzle 200. In certain embodiments, for example, the coupler slot 242 may have threading and the heat exchange extension may have matching threading such that the nozzle 200 may be screwed onto the heat exchanger 512. While threading has been described, other common fastening means may also be used to connect the heat exchanger 512 and the nozzle 200.

A sensor conduit 205 extends from the sensor opening 206 at the top end 208 and into the body 214 towards the extrusion end 220. A heater conduit 203 extends from the heater opening 202 at the top end 208 and into the body 214 towards the extrusion end 220. Nozzle 200 has a solid interior 230 of body 214. The coupler slot 242 and material conduit 240, the sensor conduit 205, and the heater conduit 203 extend through the solid interior 230 and are separated by the solid interior 230. The solid interior may be, for example, a thermally conductive material, a composition of thermally conductive materials, or a combination of conductive and insulating materials.

As shown in FIG. 8B, the heater conduit 203 and the sensor conduit 205 may for example, extend from the top end 208 in the direction of the extrusion end 220, but at an angle towards the material conduit 240. Within the first tapered section 232 the sensor conduit 205 may be, for example, angled to approximately match the angle of the taper of the first side 215. Within the first tapered section 232 the heater conduit 203 may be, for example, angled to approximately match the angle of the taper of the second side 217. The angle of the of the heater conduit 203 and the sensor conduit 205 may vary, for example, with the angle of the taper of the first side 215 and the second side 217 towards each other. The heater conduit 203 and the sensor conduit 205 may angle towards material conduit 240 such that, for example, each conduit may be at an angle that may be approximately 6° away from the heater conduit 203 and the sensor conduit 205 being parallel to each other. The angle of the heater conduit 203 and the sensor conduit 205 towards the material conduit 240 may, for example, range from approximately 0° to where approximately 0° is the heater conduit 203 being approximately parallel to the sensor conduit 205. However, despite the heater conduit 203 and the sensor conduit 205 angling towards the material conduit 240, the heater conduit 203 and the sensor conduit 205 stop before breaching the material conduit 240.

Within nozzle 200, the heater conduit 203 and the sensor conduit 205 continue through the body 214 into the second tapered section 234. The angle of the heater conduit 203 and the sensor conduit towards each other may remain approximately constant along the length of the conduit through the body 214. However, in some embodiments, the angle of the heater conduit 203 and the sensor conduit 205 may form a second angle to match the angle of the first side 215 and the second side 217 of the tapered section 234. The heater conduit 203 and the sensor conduit 205 may be close to the material conduit 240 but may not intersect with or extend into the material conduit 240, the extrudate conduit 244, or any part of the first conduit 250. There is also no intersection of the heater conduit 203 and the sensor conduit 205.

The temperature sensor 50 and/or the heater 60 as depicted in FIG. 5, may be configured (e.g., shaped and dimensioned) for used with the nozzle 200.

With reference to FIGS. 9A-9C, front, side, and perspective views of nozzle 200 are shown. The temperature sensor 50 (as depicted in FIG. 5) is, for example, inserted through the sensor opening 206 into the sensor conduit 205 and the heater 60 (as depicted in FIG. 5) may be inserted through the heater opening 202 into the heater conduit 203, in an assembled nozzle 200.

As shown in FIGS. 8B-9C, the sensor conduit 205 extends through the body 214 angled and extending towards the nozzle opening 218. The sensor conduit 205 may, for example, extend only for a portion of the length from the top end 208 to the nozzle opening 218, or the entire length from the top end 208 to the nozzle opening 218. The temperature sensor 50 (as depicted in FIG. 5) may, for example, be less than the length of the sensor conduit 205 such that the inserted temperature sensor 50 (as depicted in FIG. 5) may extend along only a portion of the sensor conduit 205. In another embodiment, the temperature sensor 50 (as depicted in FIG. 5) may be as long as the sensor conduit 205 extending along the entire length of the temperature sensor conduit 205.

As shown in FIGS. 8B-9C, the heater conduit 203 extends through the body 214 angled and extending towards the nozzle opening 218. The heater conduit 203 may, for example, extend only for a portion of the length from the top end 208 to the nozzle opening 218, or the entire length from the top end 208 to the nozzle opening 218. The heater 60 (as depicted in FIG. 5) may, for example, be less than the length of the heater conduit 203 such that the inserted heater 60 (as depicted in FIG. 5) may extend along only a portion of the heater conduit 203. In another embodiment, the heater 60 (as depicted in FIG. 5) may be as long as the heater conduit 203 extending along the entire length of the heater conduit 203.

The sensor conduit 205 may be positioned within the body but may be in close proximity to the material conduit 240 such that the temperature sensor 50 inserted in the sensor conduit 205 receives temperature information regarding the material conduit 240. The heater conduit 203 may be positioned within the body 214 but in close proximity to the material conduit 240 such that the heater 60 inserted in the heater conduit 203 heats the body of the nozzle 200 and such that the material conduit 240 may be the same temperature as the body 214. The heater conduit 203 may be positioned so that the heater 60 provides even heat distribution to the material conduit 240 during nozzle operation.

In some embodiments, the temperature sensor 50 may be embedded in the sensor conduit 205 and the heater 60 may be embedded in the heater conduit 205. In other embodiments, the temperature sensor 50 and/or the heater 60 may be removable.

Figure 10B:
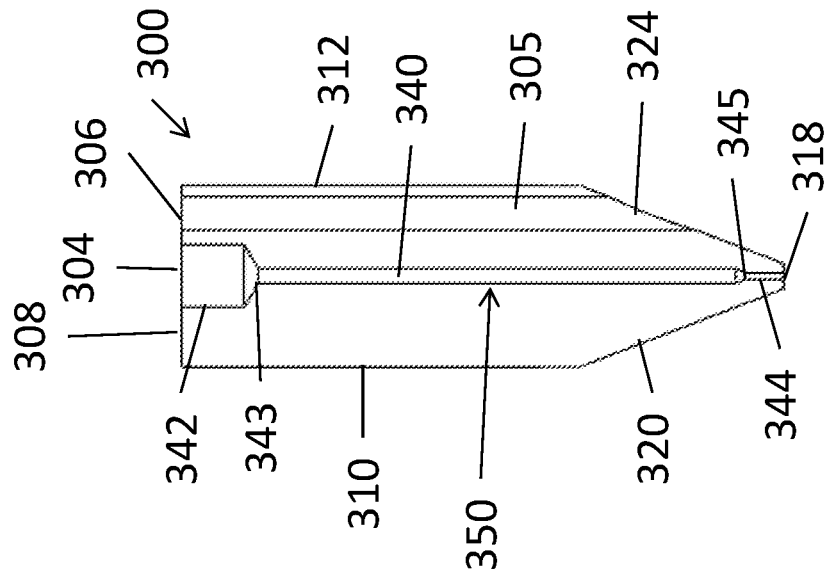
FIG. 10B, depicts a front cross section view of the third nozzle of FIG. 10A with the heater inserted into the third nozzle, in accordance with one or more embodiments set forth herein.
Figure 10A:
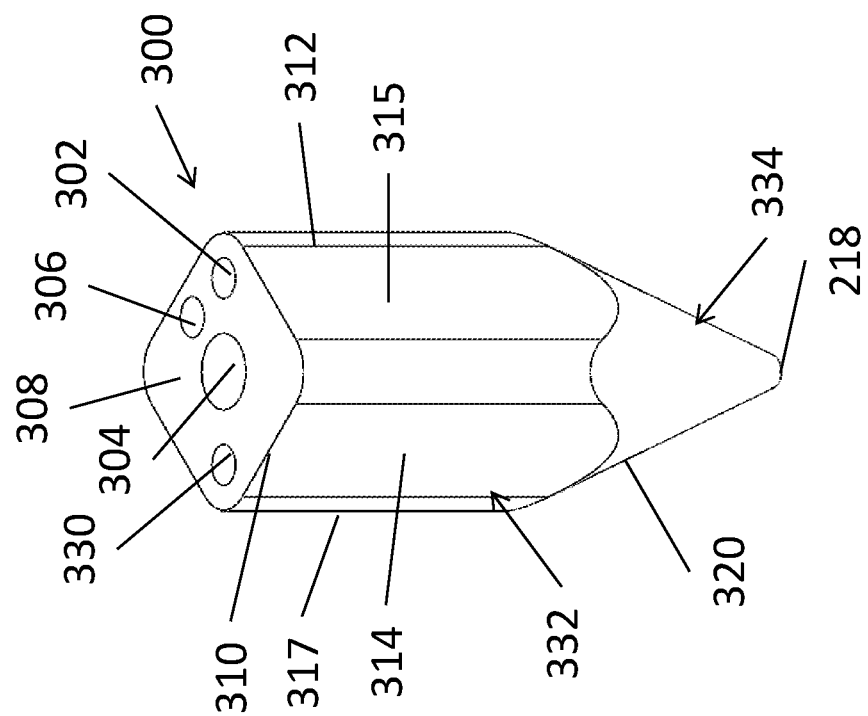
FIG. 10A, depicts a perspective view of a third nozzle, in accordance with one or more embodiments set forth herein.

With reference to FIG. 10A, an additive manufacturing extrusion nozzle 300 may be. Nozzle 300 is another embodiment of nozzles 100 and 200. The nozzle 300 has a body 314 having a front side 310 opposite a back side 312, and connected by a first side 315 and a second side 317, therebetween. The body 314 has a top end 308 opposite an extrusion end 320. The top end 308 has sides formed by the front side 310, the back side 312, the first side 315, and the second side 317, forming a square shape. The longitudinal distance from the top end 308 to the extrusion end 320 may be greater than distance from the front side 310 to the back side 312, and may be greater than the distance from the first side 315 to the second side 317. The distance from the first side 315 to the second side 317 may be as approximately the same as the distance from the front side 310 to the back side 312. In the longitudinal direction the square shape of the body extends from the top end 308 towards the extrusion end 320, for a first portion of the body 314, the first section 332, towards a second section 334. In the longitudinal direction from the first section 332 towards the extrusion end 320, the second section 334 may be formed by a tapering between the first side 315 and the second side 317 and the front side 310 may be tapered towards the back side 312, with a conical shape towards the extrusion end 320.

Tapering of the first side 315 towards the second side 317 at the second tapered section 334 along the extrusion end 320 towards the nozzle opening 318, may form an angle of taper 349 as shown in FIG. 11D. Referring to FIG. 11D, the angle of taper 349 may be 45° for the nozzle 300. A longitudinal midline 348 is show between the first side 315 and the second side 317. The angle of taper 349 may be between the midline 348 of the nozzle 300 and the first side 315 but may also be the angle between the midline 348 and the second side 317, with the angle between the midline 348 and the first side 315 being approximately equal to the angle of taper between the midline 348 and the second side 317. The angle of taper 348 may be shown as 45°, but may be an angle in a range from approximately 10° to approximately 45° in other embodiments.

The extrusion end 320 has a nozzle opening 318. The nozzle opening 318 may be, for example, substantially circular. In other embodiments, the nozzle opening may be any shape configured (e.g., shaped and dimensioned) for fused filament fabrication ("FFF") and/or fused granulate fabrication ("FGF"). The top end has a coupler connection opening 304, a sensor opening 306, a first heater opening 302, and the second heater opening 330. The first heater opening 302 and the second heater opening 330 may be adjacent to the coupler connection opening 304 but on opposite sides of the coupler connection opening 304. The first heater opening 302 may be positioned towards a corner formed by the front side 310 and the first side 315. The second heater opening 330 may be positioned towards a corner formed by the back side 312 and the second side 317. The sensor opening 306 may be adjacent to the first heater opening and adjacent to the coupler connection opening 304 towards the back side 312. As depicted in FIG. 10A, the first heater opening 302 and the second heater opening 330 may be on opposite sides of the coupler connection opening 304, however, the first heater opening 302 and the second heater opening 330, may be interchanged, or may be in different but opposite corners of body 314 or may be positioned towards opposite sides (e.g., front side 310 and back side 312 or first side 315 and second side 317) of body 314. The first side 315 and the second side 317 may be interchanged, and need not specifically be on one side or the other. The front side 310 and the back side 312 may be interchanged, and need not specifically be on one side or the other.

With reference to FIG. 10B, a frontal cross section view of the nozzle 300 is depicted. A first conduit 350 extends from the coupler opening at the top end 308 to the nozzle opening 318. The first conduit 350 may be a single diameter conduit or the first conduit 350 may include multiple sections of similar or different diameters. A coupler slot 342, which may also be referred to as a transition conduit, extends into the body 314 from the coupler connection opening 304 at the top end 308 towards the nozzle opening 318. The coupler slot 342 has a first material conduit opening 343, opposite the coupler connection opening 304. A material conduit 340 extends from the first material conduit opening 343 into body 314 towards the nozzle opening 318. The material conduit 340 has a second material conduit opening 345, from which an extrudate conduit 344 extends to the nozzle opening 318. The second material conduit opening 345 may have the extrudate conduit 344 extending therefrom, with the second material conduit opening 345 and the extrudate conduit 344 having smaller diameters than the material conduit 340. In some embodiments, the diameters may be smaller than that of the material conduit 340. However, in other embodiments, the second material conduit opening 345 and the extrudate conduit 344 may have approximately the same diameter as the material conduit 340. In some embodiments, the material conduit 340 may include the extrudate conduit 344. The first conduit 350, as shown in FIG. 10B, includes three sections; the coupler slot 342, the material conduit 340 and the extrudate conduit 344.

With reference to FIG. 3 and FIG. 10B, the heat exchanger 512 may have, for example, an extension (not shown) configured (e.g., shaped and dimensioned) for insertion through the coupler connection opening 304 and into the coupler slot 342 to connect the heat exchanger 512 to the nozzle 300. In certain embodiments, for example, the coupler slot 342 may have threading and the heat exchange extension may have matching threading such that the nozzle 300 may be screwed onto the heat exchanger. While threading has been described, other common fastening means may also be used to connect the heat exchanger 512 and the nozzle 300.

A sensor conduit 305 extends from the sensor opening 306 at the top end 308 and into the body 314 to a sensor through hole 324 positioned on the second section 334. Nozzle 300 has a solid interior 322 of body 314.

FIGS. 11A-11C are different views of nozzle 300. With reference to FIG. 11A, the sensor conduit 305 extends from the sensor opening 306 at the top end 308 and into the body 314 towards the sensor through hole 324. A first heater conduit 303 may extend from the first heater opening 302 at the top end 308 and into the body 314 to a first heater through hole 326 positioned on the second section 334.

With reference to FIG. 11B the first heater conduit 303 may extend from the first heater opening 302 at the top end 308 and into the body 314 to a first heater through hole 326. A second heater conduit 331 may extend from the second heater opening 330 at the top end 308 and into the body 314 to a second heater through hole 328 positioned on the second section 334.

With reference to FIG. 11C, the coupler slot 342 and material conduit 340, the sensor conduit 305, the first heater conduit 303 and the second heater conduit 331 extend through the solid interior 322 and are separated by the solid interior 322. The solid interior 322 may be, for example, a thermally conductive material, a composition of thermally conductive materials, or a combination of conductive and insulating materials.

The temperature sensor 50 and/or the heater 60 as depicted in FIG. 5, may be configured (e.g., shaped and dimensioned) for used with the nozzle 300. A plurality of heaters like reference heater 60 may be used with nozzle 300. Referring to FIGS. 11A-11C, a first heater 61 (also referred to as a first heat cartridge) and a second heater 62 (also referred to as a second heat cartridge) are referenced with both heaters configured (e.g., shape and dimensioned) similarly and operating similarly to reference heater 60.

With continued reference to FIGS. 11A-11C, the temperature sensor 50 is, for example, inserted through the sensor opening 306 into the sensor conduit 305, the first heater 61 may be inserted through the first heater opening 302 into the first heater conduit 303, and the second heater 62 may be inserted through the second heater opening 330 into the second heater conduit 331, in an assembled nozzle 300.

Still referring to FIGS. 11A-11C, the first heater through hole 326 may be, for example, used to adjust the longitudinal positioning of the first heater 61 within the first heater conduit 303. The second heater through hole 328 may be, for example, used to adjust the longitudinal positioning of the second heater 62 within the second heater conduit 331.

As shown in FIGS. 11A-11C, the sensor conduit 305 extends through the body 314 towards the sensor through hole 324. The temperature sensor 50 may, for example, be less than the length of the sensor conduit 305 such that the inserted temperature sensor 50 may extend along only a portion of the sensor conduit 305. In another embodiment, the temperature sensor may be as long as the sensor conduit 305 such that the inserted temperature sensor 50 may extend along the entire length of the temperature sensor conduit 305. In still other embodiments, the temperature sensor 50 may, for example, be longer than the length of the temperature sensor conduit 305 such that the inserted temperature sensor 50 has a portion of the temperature sensor extending through the sensor through hole 324 and outside of the body 314. In embodiments where the temperature sensor 50 may be longer than the length of the sensor conduit 305, the temperature sensor 50, may be configured (e.g., shaped and dimensioned) to have the portion extending from the sensor through hole 324 in contact with the surface of the extrusion end 320 of the body 314 and extending to, for example, the nozzle opening or just before the nozzle opening 318.

As shown in FIGS. 11A-11C, the first heater conduit 303 extends through the body 314 towards the first heater through hole 326. The first heater 61 may, for example, be less than the length of the first heater conduit 303 such that the inserted first heater 61 may extend along only a portion of the first heater conduit 303. In another embodiment, the first heater 61 may be as long as the first heater conduit 303 such that the inserted first heater 61 may extend along the entire length of the first heater conduit 303. In still other embodiments, the first heater 61 may, for example, be longer than the length of the first heater conduit 303 such that the inserted first heater 61 has a portion of the heater, extending through the first heater through hole 326 and outside of the body 314. In embodiments where the first heater 61 may be longer than the length of the first heater conduit 303, the first heater 61, may be configured (e.g., shaped and dimensioned) to have the portion extending from the first heater through hole 326 in contact with the surface of the extrusion end 320 of the body 314 and extending to, for example, the nozzle opening or just before the nozzle opening 318.

Referencing FIGS. 11A-11C, the second heater conduit 331 extends through the body 314 towards the second heater through hole 328. The second heater 62 may, for example, be less than the length of the second heater conduit 331 such that the inserted second heater 62 may extend along only a portion of the second heater conduit 331. In another embodiment, the second heater 62 may be as long as the second heater conduit 331 such that the inserted second heater 62 may extend along the entire length of the second heater conduit 331. In still other embodiments, the second heater 62 may, for example, be longer than the length of the second heater conduit 331 such that the inserted second heater 62 has a portion of the heater, extending through the second heater through hole 328 and outside of the body 314. In embodiments where the second heater 62 may be longer than the length of the second heater conduit 331, the second heater 62, may be configured (e.g., shaped and dimensioned) to have the portion extending from the second heater through hole 328 in contact with the surface of the extrusion end 320 of the body 314 and extending to, for example, the nozzle opening or just before the nozzle opening 318.

The sensor conduit 305 may be positioned within the body but may be in close proximity to the material conduit 340 such that the temperature sensor 50 inserted in the sensor conduit 305 receives temperature information regarding the material conduit 340. The first heater conduit 303 and the second heater conduit 331 may be positioned within the body 314 on opposite sides of but in close proximity to the material conduit 340 such that the first heater 61 inserted in the first heater conduit 303 and the second heater 62 inserted in the second heater conduit 331 heat the body of the nozzle 300 and such that the material conduit 340 and the extrudate conduit 344 may be the same temperature as the body 314.

The first heater conduit 303 and the second heater conduit 331 may be positioned so that the first heater 61 and the second heater 62 may provide even heat distribution to the material conduit 340 during nozzle operation.

As shown in FIGS. 11A-11C, the first heater conduit 303, the second heater conduit 330, and the sensor conduit 305 may be, for example, approximately parallel to each other.

In some embodiments, the temperature sensor 50 may be embedded in the sensor conduit 305, the first heater 61 may be embedded in the first heater conduit 303, and the second heater 62 may be embedded in the second heater conduit 330. In other embodiments, the temperature sensor 50 and/or the first heater 61, and/or the second heater 62 may be removable.

Figure 12B:
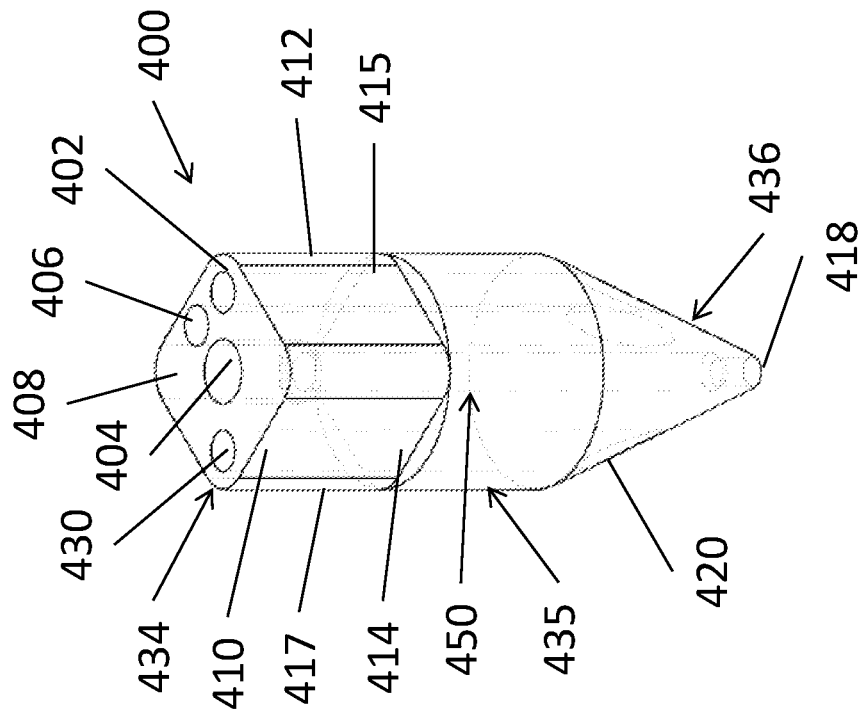
FIG. 12B, depicts a second perspective view of the fourth nozzle of FIG. 12A, in accordance with one or more embodiments set forth herein.
Figure 12A:
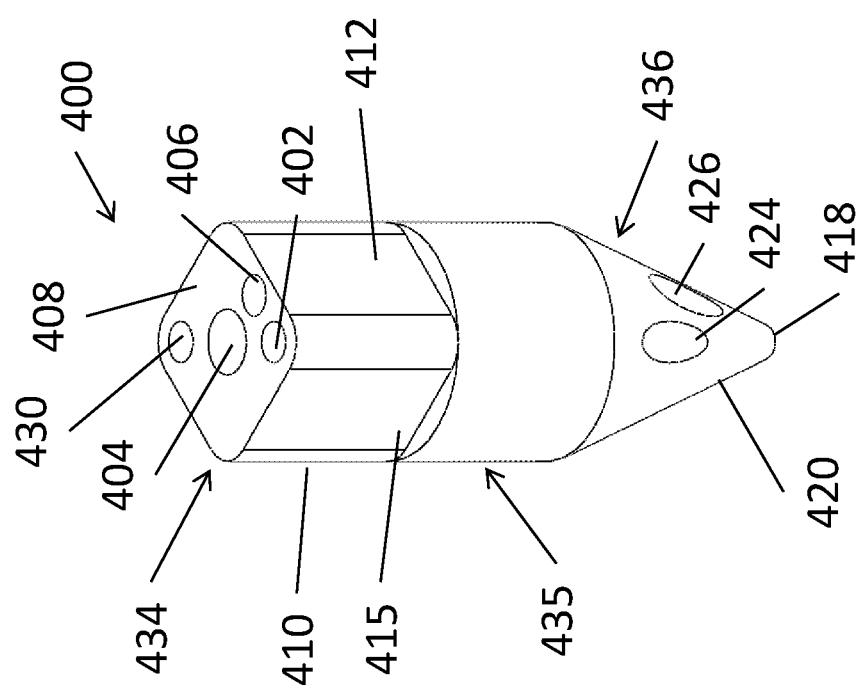
FIG. 12A, depicts a perspective view of a fourth nozzle, in accordance with one or more embodiments set forth herein.

With reference to FIG. 12A, an additive manufacturing extrusion nozzle 400 may be. Nozzle 400 is another embodiment of nozzles 100, 200, and 300. The nozzle 400 has a body 414 having first section 434, a second section 435, and a third section 436, the different sections forming the body 414 between a top end 408 and an extrusion end 420, the top end 408 being opposite the extrusion end 420. The first section 434 has a front side 410 opposite a back side 412, and connected by a first side 415 and a second side 417, therebetween, forming a square shape. The top end 408 has sides formed by the front side 410, the back side 412, the first side 415, and the second side 417, forming a square shape. The second section 435 may be between the first section 434 and the third section 436, and may have a cylindrical shape. The third section 436 may have a conical shape with the tip forming the extrusion end 420.

Tapering of the first side 415 towards the second side 417 at the third section 436 along the extrusion end 420 towards the nozzle opening 418, may form an angle of taper 449 as shown in FIG. 13D. Referring to FIG. 13D, the angle of taper 449 may be 45° for the nozzle 400. A longitudinal midline 448 is show between the first side 415 and the second side 417. The angle of taper 449 may be between the midline 448 of the nozzle 400 and the first side 415 but may also be the angle between the midline 448 and the second side 417, with the angle between the midline 448 and the first side 415 being approximately equal to the angle of taper between the midline 448 and the second side 417. The angle of taper 448 may be shown as 45°, but may be an angle in a range from approximately 10° to approximately 45° in other embodiments.

Referring to FIGS. 12A and 12B, the extrusion end 420 has a nozzle opening 418. The nozzle opening 418 may be, for example, substantially circular. In other embodiments, the nozzle opening may be any shape configured (e.g., shaped and dimensioned) for fused filament fabrication ("FFF") and/or fused granulate fabrication ("FGF"). The top end has a coupler connection opening 404, a sensor opening 406, a first heater opening 402, and the second heater opening 430. The first heater opening 402 and the second heater opening 430 may be adjacent to the coupler connection opening 404 but on opposite sides of the coupler connection opening 404. The first heater opening 402 may be positioned towards a corner formed by the front side 410 and the first side 415. The second heater opening 430 may be positioned towards a corner formed by the back side 412 and the second side 417. The sensor opening 406 may be adjacent to the first heater opening and adjacent to the coupler connection opening 404 towards the back side 412. As depicted in FIG. 12A, the first heater opening 402 and the second heater opening 430 may be on opposite sides of the coupler connection opening 404, however, the first heater opening 402 and the second heater opening 430, may be interchanged, or may be in different but opposite corners of body 414 or may be positioned towards opposite sides (e.g., front side 410 and back side 412 or first side 415 and second side 417) of body 414. The first side 415 and the second side 417 may be interchanged, and need not specifically be on one side or the other. The front side 410 and the back side 412 may be interchanged, and need not specifically be on one side or the other.

Figures 13A, 13B, 13C:
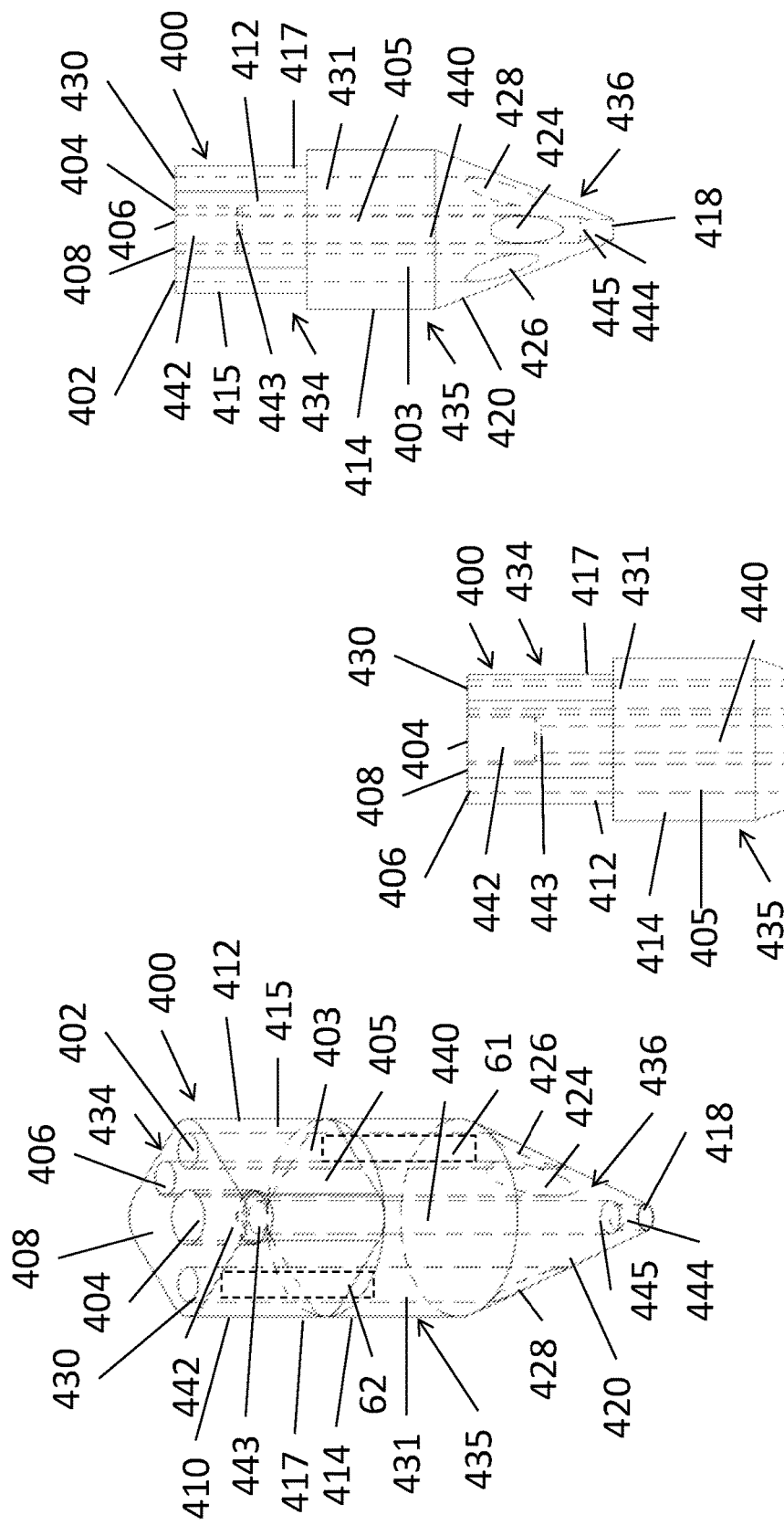
FIG. 13A, depicts a perspective view of the fourth nozzle of FIG. 12A, in accordance with one or more embodiments set forth herein.
FIG. 13B, depicts a front view of the fourth nozzle of FIG. 12A, in accordance with one or more embodiments set forth herein.
FIG. 13C, depicts a side view of the fourth nozzle of FIG. 12A, in accordance with one or more embodiments set forth herein.

Referring to FIG. 12B, a first conduit 450 extends from the coupler opening at the top end 408 to the nozzle opening 418. The first conduit 450 may be a single diameter conduit or the first conduit 450 may include multiple sections of similar or different diameters. Referring to FIGS. 13A-13C, different views of nozzle 400 are shown. With reference to FIG. 13A, a coupler slot 442, which may also be referred to as a transition conduit, extends into the body 414 from the coupler connection opening 404 at the top end 408 towards the nozzle opening 418. The coupler slot 442 has a first material conduit opening 443, opposite the coupler connection opening 404. A material conduit 340 extends from the first material conduit opening 443 into body 414 towards the nozzle opening 418. The material conduit 440 has a second material conduit opening 445, from which an extrudate conduit 444 extends to the nozzle opening 418. Nozzle 400 has a solid interior 422 of body 414. The second material conduit opening 445 may have the extrudate conduit 444 extending therefrom, with the second material conduit opening 445 and the extrudate conduit 444 having smaller diameters than the material conduit 440. In some embodiments, the diameters may be smaller than that of the material conduit 440. However, in other embodiments, the second material conduit opening 445 and the extrudate conduit 444 may have approximately the same diameter as the material conduit 440. In some embodiments, the material conduit 440 may include the extrudate conduit 444. The first conduit 450, as shown in FIG. 12B includes three sections; the coupler slot 442, the material conduit 440 and the extrudate conduit 444.

With reference to FIG. 3 and FIG. 13A, the heat exchanger 512 may have, for example, an extension (not shown) configured (e.g., shaped and dimensioned) for insertion through the coupler connection opening 104 and into the coupler slot 442 to connect the heat exchanger 512 to the nozzle 400. In certain embodiments, for example, the coupler slot 442 may have threading and the heat exchange extension may have matching threading such that the nozzle 400 may be screwed onto the heat exchanger. While threading has been described, other common fastening means may also be used to connect the heat exchanger 512 and the nozzle 400.

With reference to FIG. 13C, a sensor conduit 405 extends from the sensor opening 406 at the top end 408 and into the body 414 to a sensor through hole 424 positioned on the third section 436. A first heater conduit 403 may extend from the first heater opening 402 at the top end 408 and into the body 414 to a first heater through hole 426 positioned on the third section 436.

With reference to FIG. 13B, the first heater conduit 403 may extend from the first heater opening 402 at the top end 408 and into the body 414 to a first heater through hole 426. A second heater conduit 431 may extend from the second heater opening 340 at the top end 408 and into the body 414 to a second heater through hole 428 positioned on the third section 436.

With reference to FIG. 13A, the coupler slot 442 and material conduit 440, the sensor conduit 405, the first heater conduit 403 and the second heater conduit 431 extend through the solid interior 422 and are separated by the solid interior 422. The solid interior 422 may be, for example, a thermally conductive material, a composition of thermally conductive materials, or a combination of conductive and insulating materials.

The temperature sensor 50 and/or the heater 60 as depicted in FIG. 5, may be configured (e.g., shaped and dimensioned) for used with the nozzle 400. A plurality of heaters like reference heater 60 may be used with nozzle 400. Referring to FIGS. 13A-13C, a first heater 61 (also referred to as a first heat cartridge) and a second heater 62 (also referred to as a second heat cartridge) are referenced with both heaters configured (e.g., shape and dimensioned) similarly and operating similarly to reference heater 60.

With continued reference to FIGS. 13A-13C, the temperature sensor 50 is, for example, inserted through the sensor opening 406 into the sensor conduit 405, the first heater 61 may be inserted through the first heater opening 402 into the first heater conduit 403, and the second heater 62 may be inserted through the second heater opening 430 into the second heater conduit 431, in an assembled nozzle 400.

Still referring to FIGS. 13A-13C, the first heater through hole 426 may be, for example, used to adjust the longitudinal positioning of the first heater 61 within the first heater conduit 403. The second heater through hole 428 may be, for example, used to adjust the longitudinal positioning of the second heater 62 within the second heater conduit 431.

As shown in FIGS. 13A-13C, the sensor conduit 405 extends through the body 414 towards the sensor through hole 424. The temperature sensor 50 may, for example, be less than the length of the sensor conduit 405 such that the inserted temperature sensor 50 may extend along only a portion of the sensor conduit 405. In another embodiment, the temperature sensor may be as long as the sensor conduit 405 such that the inserted temperature sensor 50 may extend along the entire length of the temperature sensor conduit 405. In still other embodiments, the temperature sensor 50 may, for example, be longer than the length of the temperature sensor conduit 405 such that the inserted temperature sensor 50 has a portion of the temperature sensor extending through the sensor through hole 424 and outside of the body 414. In embodiments where the temperature sensor 50 may be longer than the length of the sensor conduit 405, the temperature sensor 50, may be configured (e.g., shaped and dimensioned) to have the portion extending from the sensor through hole 424 in contact with the surface of the extrusion end 420 of the body 414 and extending to, for example, the nozzle opening or just before the nozzle opening 418.

As shown in FIGS. 13A-13C, the first heater conduit 403 extends through the body 414 towards the first heater through hole 426. The first heater 61 may, for example, be less than the length of the first heater conduit 403 such that the inserted first heater 61 may extend along only a portion of the first heater conduit 403. In another embodiment, the first heater 61 may be as long as the first heater conduit 403 such that the inserted first heater 61 may extend along the entire length of the first heater conduit 403. In still other embodiments, the first heater 61 may, for example, be longer than the length of the first heater conduit 403 such that the inserted first heater 61 has a portion of the heater, extending through the first heater through hole 426 and outside of the body 414. In embodiments where the first heater 61 may be longer than the length of the first heater conduit 403, the first heater 61, may be configured (e.g., shaped and dimensioned) to have the portion extending from the first heater through hole 426 in contact with the surface of the extrusion end 420 of the body 414 and extending to, for example, the nozzle opening or just before the nozzle opening 418.

As shown in FIGS. 13A-13C, the second heater conduit 431 extends through the body 414 towards the second heater through hole 428. The second heater 62 may, for example, be less than the length of the second heater conduit 431 such that the inserted second heater 62 may extend along only a portion of the second heater conduit 431. In another embodiment, the second heater 62 may be as long as the second heater conduit 431 such that the inserted second heater 62 may extend along the entire length of the second heater conduit 431. In still other embodiments, the second heater 62 may, for example, be longer than the length of the second heater conduit 431 such that the inserted second heater 62 has a portion of the heater, extending through the second heater through hole 428 and outside of the body 414. In embodiments where the second heater 62 may be longer than the length of the second heater conduit 431, the second heater 62, may be configured (e.g., shaped and dimensioned) to have the portion extending from the second heater through hole 428 in contact with the surface of the extrusion end 420 of the body 414 and extending to, for example, the nozzle opening or just before the nozzle opening 418.

The sensor conduit 405 may be positioned within the body but may be in close proximity to the material conduit 440 such that the temperature sensor 50 inserted in the sensor conduit 405 receives temperature information regarding the material conduit 440. The first heater conduit 403 and the second heater conduit 431 may be positioned within the body 414 on opposite sides of but in close proximity to the material conduit 440 such that the first heater 61 inserted in the first heater conduit 403 and the second heater 62 inserted in the second heater conduit 431 heat the body of the nozzle 400 and such that the material conduit 440 and the extrudate conduit 444 may be the same temperature as the body 414. The first heater conduit 403 and the second heater conduit 431 may be positioned so that the first heater 61 and the second heater 62 may provide even heat distribution to the material conduit 440 during nozzle operation.

As shown in FIGS. 13A-13C, the first heater conduit 403, the second heater conduit 430, and the sensor conduit 405 may be, for example, approximately parallel to each other.

In some embodiments, the temperature sensor 50 may be embedded in the sensor conduit 405, the first heater 61 may be embedded in the first heater conduit 403, and the second heater 62 may be embedded in the second heater conduit 430. In other embodiments, the temperature sensor 50 and/or the first heater 61, and/or the second heater 62 may be removable.

With reference to nozzle 300 and nozzle 400, the interior structure of the two nozzles may be similar. A description of both has been included for clarity. However, the exterior shape of nozzle 300 and nozzle 400 differ. Nozzle 300 may be an example of a nozzle which may be formed from an additive fabrication process. Nozzle 400 may be an example of a nozzle which may be formed from a machining process. The exterior shape of the two nozzles may, for example, also be configured (e.g., shaped and dimensioned) to connect to an additive manufacturing arm or frame.

Figure 14B:
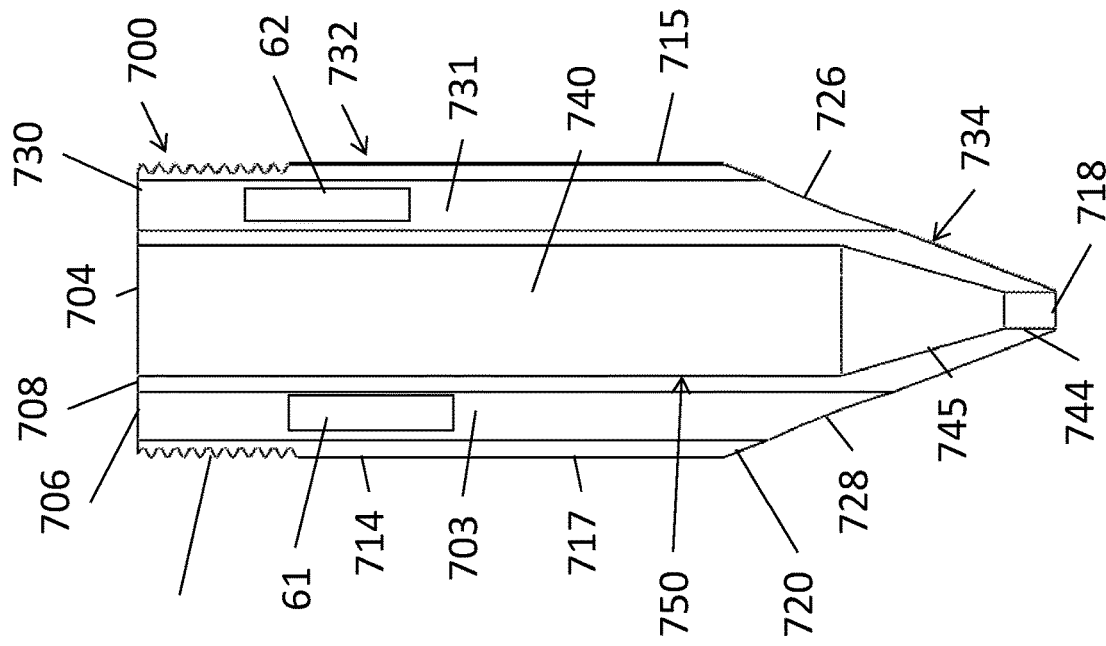
FIG. 14B, depicts a front cross section view of the pellet nozzle of FIG. 14A, in accordance with one or more embodiments set forth herein.
Figure 14A:
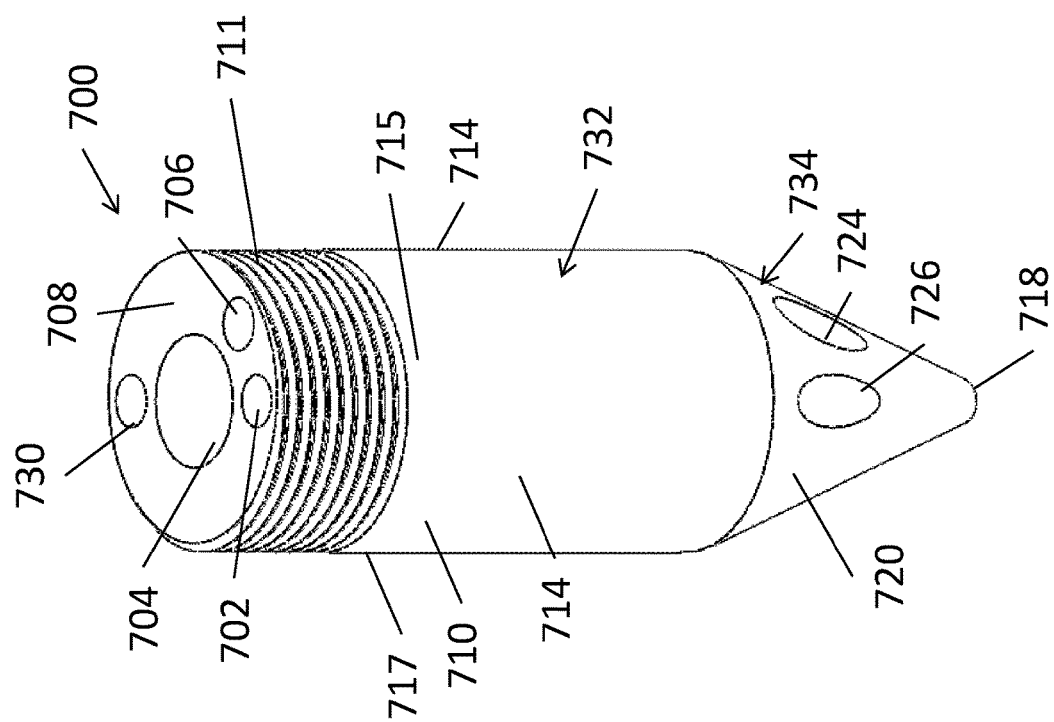
FIG. 14A, depicts a perspective view of a pellet nozzle, in accordance with one or more embodiments set forth herein.

With reference to FIG. 14A, an additive manufacturing extrusion nozzle 700 may be. Nozzle 700 is another embodiment of nozzles 100, 200, 300, and 400. The nozzle 700 has a body 714 having a front side 710 opposite a back side 712, and connected by a first side 715 and a second side 717, therebetween. The body 714 has a top end 708 opposite an extrusion end 720. The top end 708 has sides formed by the front side 710, the back side 712, the first side 715, and the second side 717, forming a circular shape. The longitudinal distance from the top end 708 to the extrusion end 720 may be greater than distance from the front side 710 to the back side 712, and may be greater than the distance from the first side 715 to the second side 717. In the longitudinal direction the body 714 extends from the top end 708 towards the extrusion end 720, for a first portion of the body 714, the first section 732. The front side 710, the back side 712, the first side 715, and the second side 717 form a cylindrical shape in the first section 732. In the longitudinal direction from the first section 732 the extrusion end 720 extends towards an extrusion opening 718 forming a second section 734 by a tapering of the first side 715, the second side 717, the front side 710, and the back side 712, with the section 734 having a conical shape.

Figure 14C:
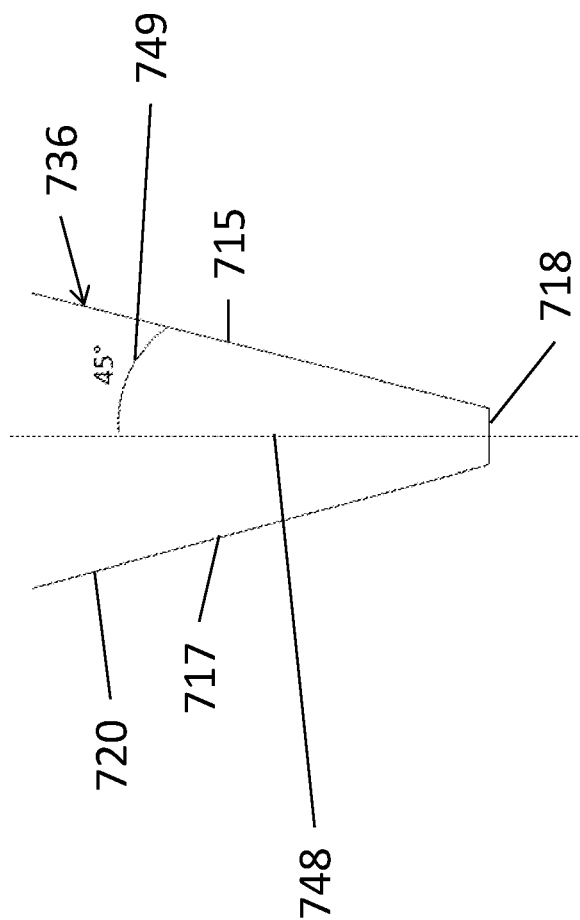
FIG. 14C, depicts an angle of taper of the front view of FIG. 14A, in accordance with one or more embodiments set forth herein.

In certain embodiments, nozzle 700 may have the conical second section 734 with, for example, an angle of taper from approximately 10° to approximately 45° relative to a longitudinal midline as already described in FIGS. 6C, 9D, 11D, and 13D. With reference to FIGS. 14A and 14C, the body 714 of nozzle 700 may have the conical second section 734 tapering from the first section 732 towards the nozzle opening 718. With reference to FIG. 14C, an angle of taper 749 may be 45°. The longitudinal midline 748 is show between the first side 715 and the second side 717. The angle of taper 749 may be between the midline 748 of the nozzle 700 and the first side 715 but may also be the angle between the midline 748 and the second side 717, with the angle between the midline 748 and the first side 715 being approximately equal to the angle of taper between the midline 748 and the second side 717. The angle of taper 748 may be as 45°, but may have a range from approximately 10° to approximately 45° in other embodiments.

With reference to FIG. 14A, the nozzle opening 718 may be, for example, substantially circular. In other embodiments, the nozzle opening may be any shape configured (e.g., shaped and dimensioned) for fused filament fabrication ("FFF") and/or fused granulate fabrication ("FGF"). From the top end 708, along the outer circumference of the body 714 of portion of the first section 732, a threading 711 may be present. The top end has the first material conduit opening 704, a sensor opening 706, a first heater opening 702, and the second heater opening 730. The first heater opening 702 and the second heater opening 370 may be adjacent to the first material conduit opening 704 but on opposite sides of the first material conduit opening 704. The first heater opening 702 may be positioned between the first material conduit opening 704 and the outer surface of the nozzle 700. The second heater opening 730 may be positioned between the first material conduit opening 704 and the outer surface of the nozzle 700. The sensor opening 706 may be adjacent to the first heater opening and adjacent to the first material conduit opening 704. As depicted in FIG. 14A, the first heater opening 702 and the second heater opening 730 may be on opposite sides of the first material conduit opening 704, however, the first heater opening 702 and the second heater opening 730, may be interchanged. The first side 715 and second side 717 may be interchanged, and need not specifically be on one side or the other. The front side 710 and the back side 712 may be interchanged, and need not specifically be on one side or the other.

With reference to FIG. 14B, a frontal cross section view of the nozzle 700 is depicted. A first conduit 750 extends from the coupler opening at the top end 708 to the nozzle opening 718. The first conduit 750 may be a single diameter conduit or the first conduit 750 may include multiple sections of similar or different diameters. A material conduit 740 extends into the body 714 from the first material conduit opening 704 at the top end 708 towards the nozzle opening 718. The material conduit 740 has a second material conduit opening 745, from which an extrudate conduit 744 extends to the nozzle opening 718. The material conduit 744 may taper towards the second material conduit opening 745. The second material conduit opening 745 may have the extrudate conduit 744 extending therefrom, with the second material conduit opening 745 and the extrudate conduit 744 having smaller diameters than the material conduit 740. In some embodiments, the diameters may be smaller than that of the material conduit 740. However, in other embodiments, the second material conduit opening 745 and the extrudate conduit 744 may have approximately the same diameter as the material conduit 740. In some embodiments, the material conduit 740 may include the extrudate conduit 744. The first conduit 750 includes two sections; the material conduit 740 and the extrudate conduit 744.

With reference to FIGS. 14A-14B, nozzle 700 may have a solid interior of body 714, through which a first heater conduit 703, a second heater conduit 731 and a sensor conduit (not shown but similar to the sensor conduit 305 of FIGS. 11A-11C, and sensor conduit 405 of FIGS. 13A-13C). The sensor conduit may, for example, extend from the sensor opening 706 at the top end 708 and into the body 714 to a sensor through hole 724 positioned on the second section 734.

The first heater conduit 703 may extend from the first heater opening 702 at the top end 708 and into the body 714 to a first heater through hole 726 positioned on the second section 734. The second heater conduit 731 may extend from the second heater opening 730 at the top end 708 and into the body 714 to a second heater through hole 728 positioned on the second section 734.

The material conduit 740, the sensor conduit, the first heater conduit 703, and the second heater conduit 731 extend through the solid interior 722 and are separated by the solid interior 722. The solid interior 722 may be, for example, a thermally conductive material, a composition of thermally conductive materials, or a combination of conductive and insulating materials.

The temperature sensor 50 and/or the heater 60 as depicted in FIG. 5, may be configured (e.g., shaped and dimensioned) for used with the nozzle 700. A plurality of heaters like reference heater 60 may be used with nozzle 700. Referring to FIGS. 14A-14C, a first heater 61 (also referred to as a first heat cartridge) and a second heater 62 (also referred to as a second heat cartridge) are referenced with both heaters configured (e.g., shape and dimensioned) similarly and operating similarly to reference heater 60.

With continued reference to FIGS. 14A-14B, the temperature sensor 50 is, for example, inserted through the sensor opening 706 into the sensor conduit, the first heater 61 is inserted through the first heater opening 702 into the first heater conduit 703, and the second heater 62 is inserted through the second heater opening 730 into the second heater conduit 731, in an assembled nozzle 700.

Still referring to FIGS. 14A-14B, the first heater through hole 726 may be, for example, used to adjust the longitudinal positioning of the first heater 61 within the first heater conduit 703. The second heater through hole 728 may be, for example, used to adjust the longitudinal positioning of the second heater 62 within the second heater conduit 731.

With reference to FIGS. 14A-14B, the sensor conduit extends through the body 714 towards the sensor through hole 724. The temperature sensor (not shown but of a similar type to temperature sensor 50 of FIG. 5) may, for example, be less than the length of the sensor conduit such that the inserted temperature sensor may extend along only a portion of the sensor conduit. In another embodiment, the temperature sensor may be as long as the sensor conduit such that the inserted temperature sensor may extend along the entire length of the temperature sensor conduit. In still other embodiments, the temperature sensor may, for example, be longer than the length of the temperature sensor conduit such that the inserted temperature sensor has a portion of the temperature sensor, extending through the sensor through hole 724 and outside of the body 714. In embodiments where the temperature sensor may be longer than the length of the sensor conduit, the temperature sensor, may be configured (e.g., shaped and dimensioned) to have the portion extending from the sensor through hole 724 in contact with the surface of the extrusion end 720 of the body 714 and extending to, for example, the nozzle opening or just before the nozzle opening 718.

As shown in FIGS. 14A-14B, the first heater conduit 703 extends through the body 714 towards the first heater through hole 726. The first heater 61 may, for example, be less than the length of the first heater conduit 703 such that the inserted first heater 61 may extend along only a portion of the first heater conduit 703. In another embodiment, the first heater 61 may be as long as the first heater conduit 703 such that the inserted first heater 61 may extend along the entire length of the first heater conduit 703. In still other embodiments, the first heater 61 may, for example, be longer than the length of the first heater conduit 703 such that the inserted first heater 61 has a portion of the heater, extending through the first heater through hole 726 and outside of the body 714. In embodiments where the first heater 61 may be longer than the length of the first heater conduit 703, the first heater 61, may be configured (e.g., shaped and dimensioned) to have the portion extending from the first heater through hole 726 in contact with the surface of the extrusion end 720 of the body 714 and extending to, for example, the nozzle opening or just before the nozzle opening 718.

Referencing FIGS. 14A-14B, the second heater conduit 731 extends through the body 714 towards the second heater through hole 728. The second heater 62 may, for example, be less than the length of the second heater conduit 731 such that the inserted second heater 62 may extend along only a portion of the second heater conduit 371. In another embodiment, the second heater 62 may be as long as the second heater conduit 731 such that the inserted second heater 62 may extend along the entire length of the second heater conduit 731. In still other embodiments, the second heater 62 may, for example, be longer than the length of the second heater conduit 731 such that the inserted second heater 62 has a portion of the heater, extending through the second heater through hole 728 and outside of the body 714. In embodiments where the second heater 62 may be longer than the length of the second heater conduit 731, the second heater 62, may be configured (e.g., shaped and dimensioned) to have the portion extending from the second heater through hole 728 in contact with the surface of the extrusion end 720 of the body 714 and extending to, for example, the nozzle opening or just before the nozzle opening 718.

The sensor conduit may be, for example, positioned within the body but in close proximity to the material conduit 740 such that the temperature sensor inserted in the sensor conduit receives temperature information regarding the material conduit 740. The first heater conduit 703 and the second heater conduit 731 may be, for example, positioned within the body 714 on opposite sides of but in close proximity to the material conduit 740 such that the first heater 61 inserted in the first heater conduit 703 and the second heater 62 inserted in the second heater conduit 731 heat the body of the nozzle 700 and such that the material conduit 740 and the extrudate conduit may be the same temperature as the body 714. The first heater conduit 703 and the second heater conduit 731 may be positioned so that the first heater 61 and the second heater 62 may provide even heat distribution to the material conduit 740 during nozzle operation.

As shown in FIGS. 14A-14B, the first heater conduit 703, the second heater conduit 730, and the sensor conduit 705 may be, for example, approximately parallel to each other.

In some embodiments, the temperature sensor may be embedded in the sensor conduit, the first heater 61 may be embedded in the first heater conduit 703, and the second heater 62 may be embedded in the second heater conduit 730. In other embodiments, the temperature sensor and/or the first heater 61, and/or the second heater 62 may be removable.

Referring to FIGS. 4-7C and FIGS. 10A-14C, and nozzle 100, nozzle 300, nozzle 400, and nozzle 700 the sensor conduits (e.g., sensor conduit 105, sensor conduit 305, sensor conduit 405, and the sensor conduit for nozzle 700) and the heater conduits (e.g., heater conduit 103, heater conduit 303, heater conduit 331, heater conduit 403, heater conduit 431, heater conduit 703, and heater conduit 731) may be substantially parallel to each other. For example, in nozzle 100 the sensor conduit 105 may be substantially parallel to the heater conduit 103 and to the material conduit 140; in nozzle 300 sensor conduit 305 may be substantially parallel to the first heater conduit 303 and the second heater conduit 331 and to the material conduit 340; in nozzle 400 the sensor conduit 405 may be substantially parallel to the first heater conduit 403 and the second heater conduit 431 and to the material conduit 440; and in nozzle 700 the sensor conduit (not shown) may be substantially parallel to the first heater conduit 703 and second heater conduit 731 and to the material conduit 740. However, one skilled in the art would understand that in other embodiments the heater conduits (e.g., heater conduit 103, first heater conduit 303, second heater conduit 331, first heater conduit 403, second heater conduit 431, first heater conduit 703, and second heater conduit 731) and the sensor conduits (e.g., sensor conduit 105, sensor conduit 305, sensor conduit 405, and the sensor conduit for nozzle 700) may be angled as in nozzle 200 of FIGS. 8A-9C, with the heater conduit 203 and sensor conduit 205 angled towards the material conduit 240, the extrudate conduit 244, or the first conduit 250. With reference to FIGS. 4-7C, the nozzle 100 may have, for example, the sensor conduit 105 and the heater conduit 103 angled towards material conduit 140, the extrudate conduit 144, or the first conduit 150. With reference to FIGS. 10A-11C, the nozzle 300 may have the first heater conduit 303 and the second heater conduit 331, for example, on opposite side of the material conduit 340 but angled towards the material conduit 340, the extrudate conduit 344, or the first conduit 350. The sensor conduit 303 may, for example, also be angled towards the material conduit 340, the extrudate conduit 344, or the first conduit 350. In such embodiments, the through holes (e.g. sensor through hole 324, first heater through hole 326, and second heater through hole 328) may, for example, not be present. With reference to FIGS. 12A-13C, the nozzle 400 may have the first heater conduit 403 and the second heater conduit 431, for example, on opposite side of the material conduit 440 but angled towards the material conduit 440, the extrudate conduit 444, or the first conduit 450. The sensor conduit 403 may, for example, also be angled towards the material conduit 440, the extrudate conduit 444, or the first conduit 450. In such embodiments, the through holes (e.g. sensor through hole 424, first heater through hole 426, and second heater through hole 428) would not be present. With reference to FIGS. 14A—14B, the nozzle 700 may have the first heater conduit 703 and the second heater conduit 731, for example, on opposite side of the material conduit 740 but angled towards the material conduit 740, the extrudate conduit 744, or the first conduit 750. The sensor conduit (not shown) may, for example, also be angled towards the material conduit 740, the extrudate conduit 744, or the first conduit 750. In such embodiments, the through holes (e.g. sensor through hole 724, first heater through hole 726, and second heater through hole 728) may, for example, not be present.

As with nozzle 200, described above, a heating conduit (e.g., heater conduit 103, heater conduit 203, first heater conduit 303, second heater conduit 331, first heater conduit 403, second heater conduit 431, first heater conduit 703, and second heater conduit 731) may be angled but does not extend into or intersect with a material conduit (e.g., material conduit 140, material conduit 340, material conduit 440, and material conduit 740), an extrudate conduit (e.g., extrudate conduit 144, extrudate conduit 344, extrudate conduit 444, and extrudate conduit 744), and/or a central conduit (e.g., first conduit 150, first conduit 350, first conduit 450, and first conduit 750). A sensor conduit (e.g., sensor conduit 105, sensor conduit 305, sensor conduit 405, and the sensor conduit of nozzle 700) does not extend into or intersect with the material conduit (e.g., material conduit 140, material conduit 340, material conduit 440, and material conduit 740), the extrudate conduit (e.g., extrudate conduit 144, extrudate conduit 344, extrudate conduit 444, and extrudate conduit 744), and/or the central conduit (e.g., first conduit 150, first conduit 350, first conduit 450, and first conduit 750). The heating conduit (e.g., heater conduit 103, heater conduit 203, first heater conduit 303, second heater conduit 331, first heater conduit 403, second heater conduit 431, first heater conduit 703, and second heater conduit 731) may be angled but does not intersect with or extend into the sensor conduit (e.g., sensor conduit 105, sensor conduit 305, sensor conduit 405, and the sensor conduit of nozzle 700), whether the sensor conduit is angled or not. For nozzle 300, nozzle 400, and nozzle 700 with a plurality of heating conduits, the first heating conduit (e.g., first heater conduit 303, first heater conduit 403, and first heater conduit 703) and the second heating conduit (e.g., second heater conduit 331, second heater conduit 431, and second heater conduit 731) may be angled but do not extend into or intersect with each other.

With reference to FIGS. 14A-14B, nozzle 700 may be with the first heating conduit 703 and the second heating conduit 731, however in certain other embodiments, nozzle 700 may have one heating conduit.

With reference to FIGS. 4-14C, in certain embodiments of nozzle 100, nozzle 200, nozzle 300, nozzle 400, and nozzle 700 the heater conduit (e.g., heater conduit 103, first heater conduit 303, second heater conduit 331, first heater conduit 403, second heater conduit 431, first heater conduit 703, and second heater conduit 731) and the sensor conduit (e.g., sensor conduit 105, sensor conduit 305, sensor conduit 405, and the sensor conduit for nozzle 700), may have a geometry (e.g., position and direction) within the body, conforming to the shape of the nozzle body. With reference to FIGS. 4-7C, the heater conduit 103 and the sensor conduit 105 may be angled and positioned within the body 114 to approximately follow the shape of the nozzle 100. With reference to FIGS.

8A-9D, heater conduit 203 and sensor conduit 205 may be angled and positioned within the body 214 to approximately follow the shape of the nozzle 200. With reference to FIGS. 10A-11D, the first heater conduit 303, the second heater conduit 331, and the sensor conduit 305 may be angled and positioned within the body 314 to approximately follow the shape of the nozzle 300. With reference to FIGS. 12A-13D, the first heater conduit 403, the second heater conduit 431, and the sensor conduit 405 may be angled and positioned within the body 414 to approximately follow the shape of the nozzle 400. With reference to FIGS. 14A-14C, the first heater conduit 703, the second heater conduit 731, and the sensor conduit (not shown) may be angled and positioned within the body 714 to approximately follow the shape of the nozzle 700.

With reference to FIGS. 4-14C, nozzle 100, nozzle 200, nozzle 300, nozzle 400, and nozzle 700 may, for example, vary in size with the additive manufacturing application. The nozzles of the types describe herein may have, for example, a longitudinal length of approximately 25 mm to 55 mm. Smaller nozzles may be, for example, used with standard commercial additive manufacturing devices. However, longitudinal nozzle length may be longer and the nozzle volume may be larger. Nozzle openings (e.g., nozzle opening 118, nozzle opening 218, nozzle opening 318, nozzle opening 418, and nozzle opening 718) may, for example, range from approximately 0.1 mm to 9 mm in diameter. Smaller diameter nozzle openings may be used, for example, for application requiring precision in the making of the printed or extruded parts (and resulting in a smoother finish).

A heater conduit (e.g., heater conduit 103, heater conduit 203, first heater conduit 303, second heater conduit 331, first heater conduit 403, second heater conduit 431, first heater conduit 703, and second heater conduit 731), may be any shape configured (e.g., shaped and dimensioned) to accommodate an additive manufacturing heater or cartridge shape. The heater conduits described herein are depicted as being cylindrical and having a circular circumference, as current standard heaters are circular or cylindrically shaped. The length of the heater used may, for example, vary with the longitudinal length of the nozzle.

A sensor conduit (e.g., sensor conduit 105, sensor conduit 205, sensor heater conduit 305, sensor heater conduit 405, and the sensor conduit of nozzle 700), may be any shape configured (e.g., shaped and dimensioned) to accommodate an additive manufacturing temperature sensor shape. The sensor conduits described herein are depicted as being cylindrical and having a circular circumference, as current standard temperature sensors are circular or cylindrically shaped. The length of the temperature sensor used may vary with, for example, the longitudinal length of the nozzle.

The nozzles described herein (e.g., nozzle 100, nozzle 200, nozzle 300, nozzle 400, and nozzle 700) have been described as having a body (e.g., body 114, body 214, body 314, body 414, and body 714) with a solid interior of a thermally conductive material, a composition of thermally conductive materials, or a combination of conductive and insulating materials through which sensor, manufacturing material, and heater conduits pass. One skilled in the art would understand that a printing material or composition of printing materials used in additive manufacturing environments involve different temperatures for creating extrudate for making structures. The printing materials may include, for example, filament or pellets. Thus, for example, brass and materials with similar hardness may be used for nozzle bodies for printing structures made from polyactide (PLA), acrylonitrile butadiene styrene (ABS), glycol modified polyethylene terephthalate (PETG), and similar plastics. Nozzles such as nozzle 100 and nozzle 200 may be, for example, used for such applications.

Nozzles made from stainless steel may be used for printing materials which require temperatures up to approximately 500° C. Nozzles with bodies made from, for example, hardened steel or high strength steel may be used for printing structures made from more abrasive materials or material with higher melting points. For such applications nozzle 300, nozzle 400, and nozzle 700 may be used. The presence of more than one heater conduit (e.g., first heater conduit 303, second heater conduit 331, first heater conduit 403, second heater conduit 431, first heater conduit 703, and second heater conduit 731) in the nozzle to accommodate more than one heater (e.g., first heater 61 and second heater 62) provides heating to the nozzle (e.g., nozzle 300, nozzle 400, and nozzle 700) and the material conduit (e.g., material conduit 340, material conduit 440, material conduit 740) to maintain higher temperatures. It should be noted that in other embodiments, there may be more than two heater conduits providing for a nozzle with more than two heaters.

For printing using engineering grade materials, including materials with chopped carbon fibers, continuous carbon fibers, or other abrasive materials, the nozzle body may, for example, include sections made from or incorporating gemstones such as rubies, diamonds, or similarly hard materials. Referring to FIGS. 10A-11C, for abrasive extrudate materials, the second material opening 345, the extrudate conduit 344, and the nozzle opening 318 of nozzle 300 may be coated in gemstones. Referring to FIGS. 12A-13C, for abrasive extrudate materials, the second material opening 445, the extrudate conduit 444, and the nozzle opening 418 of nozzle 400 may be coated in gemstones. Referring to FIGS. 14A-14B, for abrasive extrudate materials, the second material opening 745, the extrudate conduit 744, and the nozzle opening 718 of nozzle 700 may be coated in gemstones. In other embodiments of the nozzles described herein, the extrusion end 120 of nozzle 100, the second tapered section 234 of nozzle 200, the second section 334 of nozzle 300, the third section of nozzle 400, and the second section 734 of nozzle 700 may, for example, contain or be made from gemstones or a similarly hard material.

While nozzle 100 may be connected to the robotic manufacturing assembly 500 of FIGS. 1-3 and 15, nozzle 200, nozzle 300, and/or nozzle 400 may be similarly connected and used with the assembly 500 or a similar robotic manufacturing assembly. It may be understood by one skilled in the art that the assembly 500 may be connected to nozzle 200, nozzle 300, or nozzle 400 and operates in a similar fashion as described in connection with nozzle 100 described below. Robotic manufacturing assembly 500 depicts an FFF device, with the material being supplied to the nozzle 100 in a filament form. Nozzle 100, nozzle 200, nozzle 300, and nozzle 400 may be, for example, used with a device similar to robotic manufacturing assembly 500 or with standard commercially available robotic manufacturing assembly devices.

With reference to FIGS. 1-7C, during operation of nozzle 100, the heater 60 in the heater conduit 103 begins heating the nozzle 100. Heat from the heater 60 may be thermally conducted through the body 114. The temperature sensor 50, measures the temperature of nozzle 100. However, the sensor conduit 105 is positioned close to the first conduit 150 such that the temperature sensor 50 may measure the temperature of the material conduit 140 and/or the extrudate conduit 144.

With reference to FIGS. 5-6B, temperature sensor 50 and heater 60, may be embedded into the nozzle 100. With reference to FIGS. 1-3, wiring may be connected to the temperature sensor 50 and heater 60 (see FIG. 5) (this also applies to first heater 61 and second heater 62 of FIGS. 11A-11C and FIGS. 13A-13C) for transmitting data for data collection and/or for transmitting electrical power.

Figure 15:
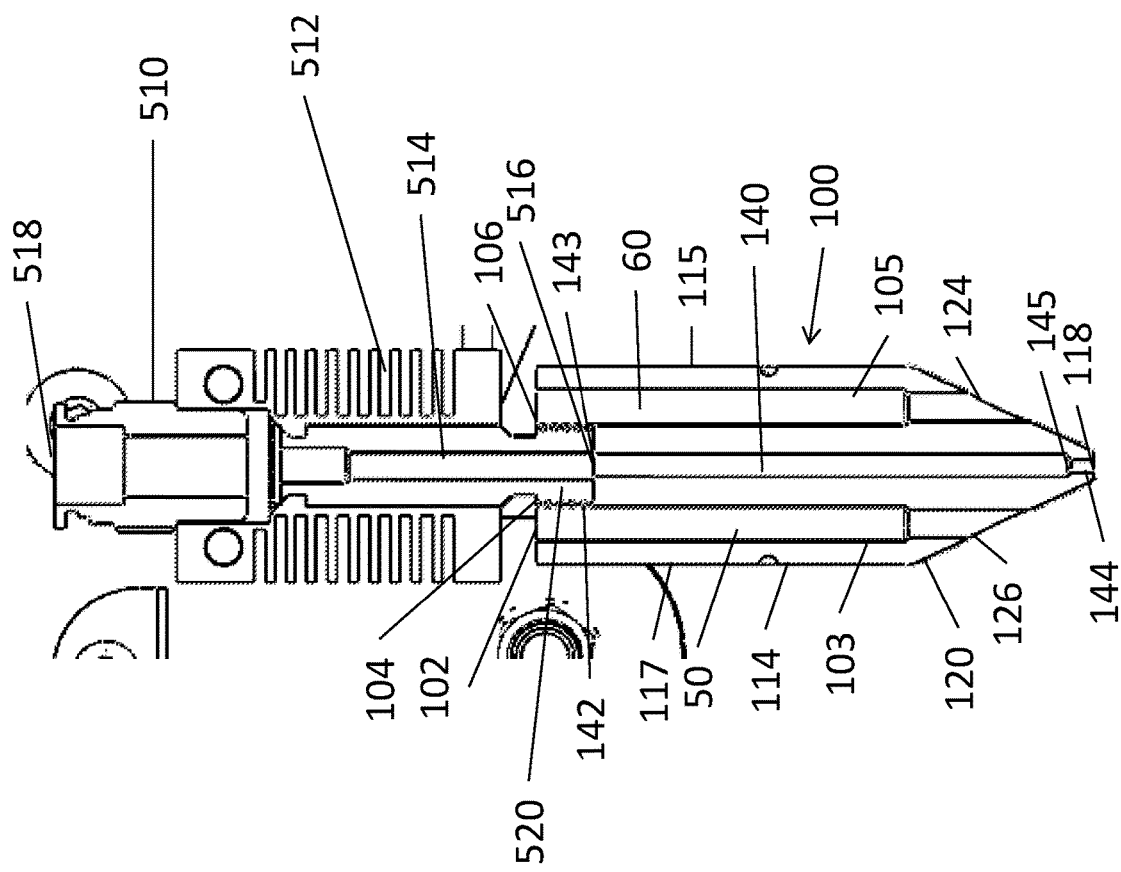
FIG. 15, depicts a front cross section view of the nozzle of FIG. 1 connected to the robotic additive manufacturing assembly of FIG. 1, in accordance with one or more embodiments set forth herein.

As depicted in FIG. 3 and with reference to FIG. 15, the coupler 510 extends through the heat exchanger 512 and into the nozzle 100. The coupler 510 has a material conduit 514 extending longitudinally through the coupler 510 such that the material conduit 514 has a first opening 516 positioned at the first material conduit opening 143. The coupler 510 has a second opening 518 configured (e.g., shaped and dimensioned) for connection to a material feed tube (not shown). A portion of the coupler insertable into the coupler slot 142 may be, for example, configured (e.g., shaped and dimensioned) for insertion through the coupler connection opening 104 and into the coupler slot 142, such that the heat exchanger 512 surrounds a portion of the coupler 510 between the second opening 518 and the first opening 516. The material feed tube may be connected to the coupler 510 at the end with the second opening 518. During operation of the robotic additive manufacturing assembly 500, the connected material feed tube provides material into the second opening 518 of the coupler 510. Thus, material travels through the feed tube, through the material conduit 514 of the coupler 510, through the first opening 516 and the first material conduit opening 143, through the material conduit 140, through the second material opening 145, through the extrudate conduit 144, and out the nozzle opening 118. The material may be heated throughout its passage through the material conduit 140 and/or the extrudate conduit 144.

With continued reference to FIG. 15, the portion of the coupler 510 inserted into the coupler slot 142, may act as a heat break 520. Insulating material may be, for example, part of the coupler at this connection, or insulating material may be positioned between the portion of the coupler within the coupler slot 142 and the interior surface of the coupler slot 142. In some embodiments, insulating material may surround the coupler slot 142.

Still referring to FIG. 15, heat transfer between the nozzle 100 and the heat exchanger 512 surrounded section of the coupler 510 may be inhibited by the heartbreak. Thus, as nozzle 100 is heated by the heater 60, the temperature of the nozzle 100, the material conduit 140, and the extrudate conduit 144 rises to the temperature of the heater 60. However, the coupler material conduit 514 of the coupler 510 may be insulated by the heat break 520 and the temperature may remain lower than the temperature of the nozzle 100. The material conduit 514 may be kept, for example, below the filament material's glass transition temperature until the material passes through the first opening 516 and into the first material opening 143. In other embodiments, the portion of the coupler material conduit 514 within the coupler slot 142 may, for example, be heated such that the material may transition from below to above the glass transition temperature as the material nears the first opening 516. Maintaining a cooler temperature within the coupler material conduit 514 for filament material pushed through the coupler 510 to the nozzle 100, for example, below the glass transition temperature, provides for greater control as the material is fed through the coupler material conduit 514 of the coupler 510 and into the material conduit 140. A feed control system (not shown) may feed filament material into the coupler 510 and nozzle 100. Filament material entering the first material opening 143 may still have some rigidity before the filament material turns to a liquid state in the material conduit 140. The material feed speed may be regulated so that material entering the material conduit 140 enters at a desired temperature and the volume of material transitioned from a solid state to a liquid state may be regulated along the material conduit 140 and the extrudate conduit 144. The material may be, for example, heated above the glass transition temperature as the material is moved along the material conduit 140. The material entering the material conduit 140 may enter through the first material opening 143 in a solid state and the material may be liquefied as it passes along the material conduit. Entering the second material opening 145, the material may be in a liquid state, and the liquid state may be maintained as the material continues through the extrudate conduit 144 and exits the nozzle opening 118. Since the heating conduit 103 having heater 60 may extend along the longitudinal length of the nozzle 100 or a significant portion of the longitudinal length of nozzle 100, the flow rate of extrudate may be controlled by heating nozzle 100 and the entire material conduit 140 and the extrudate conduit 144 to a desired temperature. A steady extrudate flow may be maintained by having a constant temperature provided by the heater 60 or the heater 60 may be cycled on/off to adjust the flow rate through the material conduit 140, through the extrudate conduit 144, and out the nozzle opening 118. The temperature sensor 50 within the sensor conduit 105 may be, for example, used to collect temperature data about the nozzle 100, the material conduit 140, and the extrudate conduit 144. The temperature sensor 50 may also provide temperature data to switch the heater 60 on/off to maintain a constant and/or desired temperature in the nozzle 100.

An improvement over current commercial nozzles is the presence of the heater 60 placed within the nozzle 100 and extending into the nozzle itself. The heater 60, depending on heater length, may extend along the length or a significant portion of the length. Material may be heated within the material conduit 140 and the extrudate conduit 144, and/or along the longitudinal length of the nozzle 100. Having the temperature sensor 50 within the nozzle 100 provides temperature readings of the material conduit 140 or close to the material conduit 140. By heating material along the longitudinal length of the nozzle 100, extrusion speeds may be increased and extrudate may exit the nozzle opening 118 at a faster rate than current nozzles. Furthermore, by heating along the longitudinal length of the nozzle 100, material exiting the nozzle opening 118 below the glass transition temperature may be mitigated, providing for stronger structures.

With reference to FIGS. 1-3, 6A, 6B, and 15, as material enters through the first material opening 143, material may be heated above its glass transition temperature. The material conduit 140 and the extrudate conduit 144 may be maintained at a desired temperature above the materials glass transition temperature. The desired temperature may be, for example, the temperature of the heater 60 or the temperature may be within a range, regulated by an on/off cycling which may be based on temperature signal feedback from the temperature sensor 50. The material within the material conduit 140 may be heated and converted to a liquid state. The diameter of the material conduit 140 may be configured (e.g., shaped and dimensioned) to permit the filament material to enter the material conduit 140 where the filament material may be below the glass transition temperature and still has some rigidity and shape. For example, standard commercial plastic filament may be between approximately 1.75 mm and 2.85 mm. The nozzle 100 selected for use with such filament of such diameter may have, for example, a material conduit diameter that provides for a tolerance of approximately 0.5 mm to 0.9 mm where the diameter of the material conduit 140 may be sized for a particular filament diameter plus tolerance. Thus, nozzle 100 may, for example, have diameters sizes of material conduit 140 configured (e.g., shaped and dimensioned) to accommodate the different filament materials, and different material types. The diameter of the extrudate conduit 144 may be for example, the same diameter as that of the nozzle opening 118. The diameter of the extrudate conduit 144 and the nozzle opening 118 may be configured (e.g., shaped and dimensioned) to provide for the extrudate exiting at a desired diameter. The nozzle 100 may, for example, have diameter sizes of the extrudate conduit 144 and nozzle opening 118 based on a desired extrudate diameter and application.

While the operation of nozzle 100 with the robotic additive manufacturing assembly 500 has been depicted in FIGS. 1-3 and 15, and described in detail herein, nozzle 200, nozzle 300, and nozzle 400 may also be used with the robotic additive manufacturing assembly 500, or a similar robotic additive manufacturing assembly. The description herein of the operation of nozzle 100 with robotic additive manufacturing assembly 500 may be interchanged with nozzle 200, nozzle 300, and nozzle 400 with like parts and components. Similarly, references to single heating conduits (e.g., heating conduit 103 and heating conduit 203) and a single heater (e.g., heater 60) may apply to more than one heating conduit as in the heating conduits of nozzle 300 and nozzle 400 (e.g., first heater conduit 303, second heater conduit 331, first heater conduit 403, and second heater conduit 431) and the maintenance of temperature along the material conduit and extrudate conduit (e.g., material conduit 340 and extrudate conduit 344, and material conduit 440 and extrudate conduit 444).

The robotic additive manufacturing assembly 500 depicted in FIGS. 1-3 and 15 is described in operation using filament material. With reference to FIGS. 1-3, 14A-14B, and a similar robotic additive manufacturing assembly may be connected to nozzle 700 for FGF, with the material fed to the nozzle being pellets rather than filament. Unlike nozzle 100, nozzle 200, nozzle 300, and nozzle 400, nozzle 700 has threading 711 on the outer surface of the body (e.g., body 714) and no coupler slot (e.g., coupler slot 142). One skilled in the art would understand that nozzle 700 may be configured (e.g., shaped and dimensioned) to connect to an FGF assembly similar to the robotic additive manufacturing assembly 500. The nozzle 700 may be, for example, screwed into the FGF assembly by threading 711 to secure nozzle 700 rather than by connection of the coupler 510 to the coupler slot 142 of nozzle 100 (and similar coupler slots of nozzle 200, nozzle 300, and nozzle 400). The coupler connected to nozzle 700 may have an auger within a coupler material conduit feeding pellet material into the material conduit 740. The first material conduit opening 704 may be configured (e.g., shaped and dimensioned) to accommodate a pellet feed auger providing pellet material for extrusion by the nozzle 700. The auger or a portion of such auger being insertable into the material conduit 740. The presence of an auger within a coupler feed tube is common for FGF assemblies and may be insertable into nozzles used with such assemblies.

With continued reference to reference to FIGS. 1-3, 14A-14B, and 15, the operation of the robotic additive manufacturing assembly 500 as described in detail above will not be repeated except as to differences in the operation of nozzle 700. The feed tube may pass through a heat exchanger, similar to the heat exchanger 512 of FIG. 3 but in some embodiments, the heat exchanger may not be used. A heat break may or may not be present in an FGF system, thus pellet material may be heated due to the temperature of the nozzle 700, prior to entering the material conduit 740. The lack of a heat break may result in material entering material opening 704 already in a liquid state and continuing along the material conduit 740, through the extrudate conduit 744, and exiting from the nozzle opening 718 above the glass transition temperature and in a liquid state.

With reference to FIGS. 5 and 14B, the temperature sensor 50 and the first heater 61 and second heater 62 may be embedded into the nozzle 700. With reference to FIGS. 1-3, and wiring may be connected to the temperature sensor 50 and first heater 61 and second heater 62 for transmitting data for data collection and/or for transmitting electrical power.

The volume of the nozzle (e.g., nozzle 100, nozzle 200, nozzle 300, nozzle 400, and nozzle 700) has a direct relation to the longitudinal heater length and the number of heaters which may be inserted into the nozzle. A shorter nozzle length (e.g., from top end 108 to nozzle opening 118, from top end 208 to nozzle opening 218, from top end 308 to nozzle opening 318, from top end 408 to nozzle opening 418, from top end 708 to nozzle opening 718) may, for example, have a shorter length for the heater 60 or the first heater 61 and the second heater 62. A nozzle with a single heater (e.g., nozzle 100 and nozzle 200) may be, for example skinnier than a nozzle with multiple heaters (e.g., nozzle 300, nozzle 400, and nozzle 700).

For certain other embodiments, since the nozzles described herein (e.g., nozzle 100, nozzle 200, nozzle 300, nozzle 400, and nozzle 700) taper towards the nozzle opening (e.g., nozzle opening 118, nozzle opening 218, nozzle opening 318, nozzle opening 418, and nozzle opening 718), there is less volume of material to heat towards the nozzle opening as compared to the volume of material towards the nozzle top end (e.g., top end 108, top end 208, top end 308, top end 408, and top end 708). Thus, the heater may, for example, only extend through a portion of the length of the heater conduit (e.g., heater conduit 103, heater conduit 203, first heater conduit 303, second heater conduit 331, first heater conduit 403, second heater conduit 431, first heater conduit 703, and second heater conduit 731) to provide a constant temperature from the top end to the nozzle opening. Thus, temperature regulation at the nozzle opening may keep extrudate above a glass transition temperature.

For certain embodiments, nozzles (e.g., nozzle 100, nozzle 200, nozzle 300, nozzle 400, and nozzle 700), a heater may extend the length of the heater conduit (e.g., heater conduit 103, heater conduit 203, first heater conduit 303, second heater conduit 331, first heater conduit 403, second heater conduit 431, first heater conduit 703, and second heater conduit 731) and out a through hole (e.g., heater through hole 126, first heater through hole 326, second heater through hole 328, first heater through hole 426, second heater through hole 428, first heater through hole 726, and second heater through hole 728), and along the outer surface of the nozzle towards the nozzle opening (e.g., nozzle opening 118, nozzle opening 318, nozzle opening 418, and nozzle opening 718). The heater extended through the heater conduit and to the nozzle opening may be, for example, to maintain a desired temperature along the longitudinal length of the nozzle and at the nozzle opening.

For larger nozzles, a second heater may, for example, be used to maintain temperature throughout the nozzle (e.g., nozzle 300, nozzle 400, and nozzle 700). Longer heaters extending through the through holes (e.g., first heater through hole 326, second heater through hole 328, first heater through hole 426, second heater through hole 428, first heater through hole 726, and second heater through hole 728) may be used to also maintain temperature around the nozzle opening.

Figure 16A:
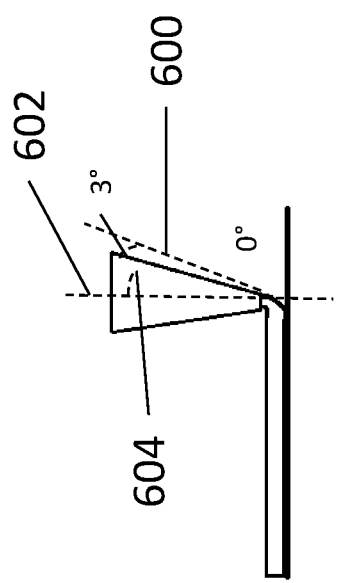
FIG. 16A, depicts a nozzle depositing extrudate at a 0° angle, in accordance with one or more embodiments set forth herein.
Figure 16B:
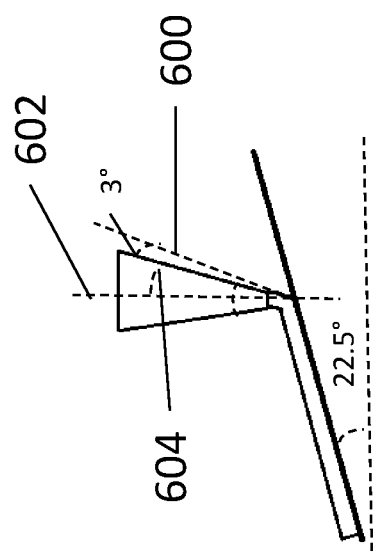
FIG. 16B, the nozzle of FIG. 16A depositing extrudate at a 22.5° angle, in accordance with one or more embodiments set forth herein.
Figure 16C:
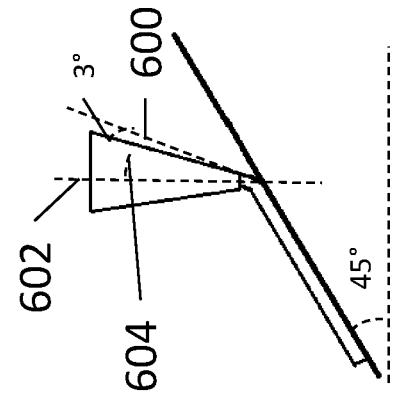
FIG. 16C, depicts the nozzle of FIG. 16A depositing extrudate at a 45° angle, in accordance with one or more embodiments set forth herein.

With reference to FIGS. 16A-16C, a nozzle (e.g., nozzle 100, nozzle 200, nozzle 300, nozzle 400, and nozzle 700) material may be printed or extruded at various angles. With reference to FIG. 16A, a horizontal surface may be, for example, considered a 0° angle and an embodiment of the nozzle is depicted printing at a 0° angle. The angles described in FIGS. 16B and 16C may be, for example, relative to the horizontal surface. Thus a 22.5° printing angle depicted by an embodiment of the nozzle in FIG. 15B and the 45° angle depicted by an embodiment of the nozzle in FIG. 15C are relative to the horizontal surface. In other embodiments, since printing may be three dimensional and robotic assemblies may have a plurality of degrees of freedom of movement, angles may be considered relative to a plane formed in an X, Y, and Z Cartesian space. The nozzles described herein (e.g., nozzle 100, nozzle 200, nozzle 300, and nozzle 400) may be, for example, configured (e.g., shaped and dimensioned) to provide extrudate material at or above angles of 22.5° without the nozzle or nozzle components or the robotic additive manufacturing assembly components interfering with the extrudate. The nozzles described herein may be, for example, configured (e.g., shaped and dimensioned) to provide extrudate material at or above angles of 45° without the nozzle or nozzle components interfering with the extrudate.

The several embodiments of the nozzles described herein (e.g., nozzle 100, nozzle 200, nozzle 300, nozzle 400, and nozzle 700 of FIGS. 1-15) have integrated heaters (e.g., heater 60, first heater 61, and/or second heater 62) within the heater conduits (e.g., heater conduit 103, heater conduit 203, first heater conduit 303, second heater conduit 331, first heater conduit 403, and second heater conduit 431, and first heater conduit 703, and second heater conduit 731) extending through the nozzle body (e.g. body 114, body 214, body 314, body 414, and body 714) and have no heating block as a separate component between a heat exchanger (e.g., heat exchanger 512 or a similar FGF version of a heat exchanger) and the nozzle (e.g., nozzle 100, nozzle 200, nozzle 300, nozzle 400, and nozzle 700). Thus, the nozzles described herein may be suited to printing at angles from 0° to angles above 45° as depicted in FIGS. 16A-16C. With reference to FIGS. 16A-16C, the nozzles described herein may, for example, print at an angle 600 that may be approximately 3° from the angle of taper (e.g., the angle of taper 149, the angle of taper 249, the angle of taper 349, the angle of taper 449, and the angle of taper 779) of the conical nozzle ends (e.g., the angle of taper 149 of extrusion end 120, the angle of taper 249 of the second tapered section 234, the angle of taper 349 of the second section 334, the angle of taper 449 of third section 436, and the angle of taper 749 of the second section 734) without interfering with the extrudate emanating from the nozzle opening or interfering with an angled surface on which extrudate may be layered or extruded as a free standing structure. The angle 600 may be, measured from the surface of tapered section (e.g. the extrusion end 120, the second tapered section 234, the second section 334, the third section 436, and the second section 734). For example, a maximum printing angle for an angle of taper 149 of approximately 45° may be, approximately 42° from a horizontal surface. In another example, a maximum printing angle for an angle of taper 149 of approximately 10° may be, approximately 77° from a horizontal surface.

The angle 600 of approximately 3° provides for space to inhibit nozzle contact with the extruded material structure at maximum printing angles for the nozzle (e.g., nozzle 100, nozzle 200, nozzle 300, nozzle 400, and nozzle 700). However, in certain other embodiments, the angle 600 may be less than 3° increasing the maximum printing angle to less than or equal to 80°, or having enough space so that the nozzle does not make contact with the extruded structure. In still certain other embodiments, the angle 600 may be greater than 3°, decreasing that maximum printing angle.

The embodiments listed herein with respect to the nozzles of FIGS. 4-14C, may, for example, use no insulation to maintain nozzle temperature. The heater (e.g., heater 60, first heater 61, and second heater 62) may also extend to match the nozzle geometry (e.g., nozzle shape) and be configured (e.g. positioned, shaped, and dimensioned) to reach and maintain a desired material conduit temperature. The embodiments of the invention listed herein regulate and maintain temperature within the material conduit (e.g., material conduit 140, material conduit 240, material conduit 340, material conduit 440, and material conduit 740) without needing insulating material within the nozzle and/or around the outer surface of the nozzle (e.g., nozzle 100, nozzle 200, nozzle 300, and nozzle 400). While a heat break 520 or the addition of insulating material may be present in some embodiments described herein, the presence of such insulating material may be used to minimize temperature within a coupler material tube and not to maintain a temperature within the nozzles themselves.

In other embodiments nozzles such as those described by nozzle 100 and nozzle 200, may have a second heater conduit and a second heater. In other embodiments nozzles such as those described by nozzle 300, nozzle 400, and nozzle 700 may have more than two heater conduits and more than two heaters may be used.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

What is claimed is:

1. A nozzle for additive manufacturing, comprising:
   a body comprising:
   a thermally conductive material, a front side opposite a back side, a first side opposite a second side, the first side and the second side connected to and between the front side and the back side; and
   a top end opposite a nozzle opening; and
   an extrusion end, comprising a tapered section of the first side, the second side, the front side, and the back side, tapering to the nozzle opening;
   a first conduit, extending through the body from an opening in the top end to the nozzle opening in the extrusion end;
   a heater conduit, adjacent to the first conduit, extending from a heater opening in the top end and through the body into the extrusion end; and
   a sensor conduit, adjacent to the first conduit, extending from a sensor opening in the top end and through body into the extrusion end.

2. The nozzle of claim 1, wherein an angle of taper of the tapered section between a midline and the first side of the extrusion end is from 10° to 45°, the midline extending longitudinally through the first conduit and wherein, the first side and the second side symmetrically angle about the midline.

3. The nozzle of claim 1, further comprising a heater within the heater conduit and a temperature sensor within the sensor conduit, wherein the heater is integrated in the heater conduit.

4. The nozzle of claim 1, further comprising a second heater conduit adjacent to the first conduit and extending from a second heater opening in the top end and into the body towards the extrusion end; the heater conduit and the second heater conduit positioned on opposite sides of the first conduit.

5. The nozzle of claim 4, further comprising a second heater within the second heater conduit, wherein the second heater is integrated in the second heater conduit.

6. The nozzle of claim 1, wherein the heater conduit extends into the body angled towards the first conduit and the sensor conduit extends into the body angled towards the first conduit.

7. The nozzle of claim 6, wherein the heater conduit and the sensor conduit do not intersect the first conduit; and the heater conduit and the sensor conduit do not intersect each other.

8. The nozzle of claim 4, wherein the heater conduit extends into the body angled towards the first conduit, the second heater conduit extends into the body angled towards the first conduit, and the sensor conduit extends into the body angled towards the first conduit.

9. The nozzle of claim 8, wherein the heater conduit, the second heater conduit, and the sensor conduit do not intersect the first conduit; and the heater conduit, the second heater conduit, and the sensor conduit do not intersect each other.

10. The nozzle of claim 1, wherein the first conduit comprises:

a coupler connection slot from the coupler connection opening to a first material conduit opening; and an extrudate conduit from the nozzle opening to a second material conduit opening; the first material conduit opening and the second material conduit opening connected by a material conduit.

11. The nozzle of claim 2, wherein the heater conduit extends to a heater through hole in the extrusion end, and the heater is positioned between the heater opening and the heater through hole.

12. The nozzle of claim 3, wherein the sensor conduit extends to a sensor through hole in the extrusion end, and the temperature sensor is positioned between the sensor opening and the sensor through hole.

13. The nozzle of claim 5, wherein the second heater conduit extends to a second heater through hole in the tapered section, the second heater through hole is positioned on the extrusion end and the second heater positioned between the second heater opening and the second heater through hole.

14. The nozzle of claim 3, wherein temperature of the nozzle and along the material conduit is constant, and nozzle extrudate material is maintained at a constant flow rate.

15. The nozzle of claim 3, wherein temperature of the nozzle and along the material conduit is varied based on feedback from the temperature sensor, and nozzle extrudate material is maintained at a constant flow rate.

16. The nozzle of claim 14, wherein temperature of the nozzle and along the material conduit is above an extrudate material glass transition temperature.

17. The nozzle of claim 16, wherein the nozzle is fixed to a robotic manufacturing assembly and the nozzle moved by the robotic manufacturing assembly.

18. The nozzle of claim 17, wherein the nozzle extrudes material at inclinations from to above 22.5° during operation of the robotic manufacturing assembly.

19. The nozzle of claim 18, wherein the nozzle extrudes material at inclinations of up to 80° during operation of the robotic manufacturing assembly.

20. The nozzle of claim 1, wherein the front side, the back side, the first side and the second side form a cylindrical body; and the tapered extrusion end forms a conical tapered section.

* * * * *